US007693724B2

(12) United States Patent
Bryant

(10) Patent No.: US 7,693,724 B2
(45) Date of Patent: Apr. 6, 2010

(54) MULTIDISCIPLINE SITE DEVELOPMENT AND RISK ASSESSMENT PROCESS

(75) Inventor: John Bryant, Carrollton, TX (US)

(73) Assignee: Bryant Consultants, Inc., Carrollton, TX (US)

( * ) Notice: Subject to any disclaimer, the term of this patent is extended or adjusted under 35 U.S.C. 154(b) by 1778 days.

(21) Appl. No.: 10/689,290

(22) Filed: Oct. 20, 2003

(65) Prior Publication Data

US 2005/0086096 A1   Apr. 21, 2005

(51) Int. Cl.
*G06Q 10/00* (2006.01)

(52) U.S. Cl. .............................................. 705/1; 705/7

(58) Field of Classification Search ........................ 705/1
See application file for complete search history.

(56) References Cited

U.S. PATENT DOCUMENTS

| | | | |
|---|---|---|---|
| 4,755,944 A | 7/1988 | Glass | |
| 5,021,976 A | 6/1991 | Wexelblat | |
| 5,373,443 A | 12/1994 | Lee | |
| 5,914,603 A | 6/1999 | Daily et al. | |
| 6,055,481 A | 4/2000 | Johansen | |
| 6,147,497 A | 11/2000 | Berryman | |
| 6,295,512 B1 | 9/2001 | Bryant | |
| 6,397,202 B1* | 5/2002 | Higgins et al. | ................. 706/47 |
| 6,675,127 B2* | 1/2004 | LaBlanc et al. | ............. 702/181 |
| 2001/0032051 A1 | 10/2001 | Grismore | |
| 2001/0052108 A1* | 12/2001 | Bowman-Amuah | ............. 717/1 |
| 2003/0065641 A1* | 4/2003 | Chaloux | ......................... 707/1 |
| 2003/0088446 A1* | 5/2003 | Phelps et al. | .................... 705/7 |
| 2003/0160818 A1* | 8/2003 | Tschiegg et al. | ............. 345/743 |
| 2003/0167180 A1* | 9/2003 | Chung et al. | .................... 705/1 |
| 2003/0182337 A1* | 9/2003 | Wefers et al. | ................ 708/490 |
| 2005/0192963 A1* | 9/2005 | Tschiegg et al. | ............... 707/9 |

OTHER PUBLICATIONS

Creating a business risk inventory Kurt F Reding; Craig H Barber; Kristine K Digirolamo The Internal Auditor; Feb. 2000; 57, 1; ABI/INFORM Global p. 47.*

* cited by examiner

*Primary Examiner*—John G Weiss
*Assistant Examiner*—Candice D Carter
(74) *Attorney, Agent, or Firm*—Schultz & Associates, P.C.

(57) ABSTRACT

A software application is provided designed to encourage collaboration between professional disciplines related to land development and construction projects. A graphical risk analysis system is provided based on answers to interdisciplinary questions related to risks. Use of the system promotes a complete checklist of interdisciplinary and informational consultation which, when completed, reduces the risk related to land development.

2 Claims, 31 Drawing Sheets

BRYANT
CONSULTANTS

306 ~ [ PROJECT ADMIN ]         310 ~ [ CONTACT ADMIN ]
                                 312 ~ [ GEONEERING OVERVIEW ]
                                 314 ~ [ LOG OUT ]

Geoneering
Project: Swampland Estates Phase I [ ! ]

| Risks | Civil | Site Development | Environmental | Geotechnical | Structural |

Have you participated in an early development, pre-construction
meeting to evaluate potential civil site challenges?          More Info ~ 1004

1006 ~ ● Yes        1008 ~ ○ No
1010 ~ ○ Don't know 1012 ~ ○ Skip for now

Has the civil engineer provided positive grades on each of the building lots?   More Info ~ 1004

1006 ~ ○ Yes        1008 ~ ○ No
1010 ~ ○ Don't know 1012 ~ ○ Skip for now

Has a sufficient pad design been done to avoid excessive cut and fill beneath
the building pads?                                            More Info ~ 1004

1006 ~ ● Yes        1008 ~ ○ No
1010 ~ ○ Don't know 1012 ~ ○ Skip for now

BRYANT
CONSULTANTS

Maintain System Users

1802 — [ ADMIN MAIN MENU ]
314 — [ LOG OUT ]

2314 — User ID: 17 (Automatically assigned)
2316 — User Name: demo (Login ID)
2318 — Password: qhbaenIdxDkMyYcj (Encoded – not actual password)
2320 — Start Date: ? (MM/DD/YY)
2322 — End Date: ? (MM/DD/YY)
2324 — Admin User: ☐ (Check this box to make the user an admin user!)
2326 — Client: 8 - Demo    [ Maintain Client List ]
2328 — Failure Count: 0 (Reset to zero if user is locked out!)
2330 — Phone: 0

2332

Audit Info
Created: 11/12/02  11 : 05 : 02   5 - kzjones
Updated: 11/12/02  10 : 59 : 32   14 - mgehrig   — 2310

2302 — [Submit]  [Delete] — 2304
2306 — [Back to List of Users]   2312

2308 — [ ADMIN MAIN MENU ] [ LOG OUT ] — 2310

B R Y A N T
CONSULTANTS

Maintain Questions — 2408

1802 — [ ADMIN MAIN MENU ]
[ LOG OUT ]
314

[NEW] 2406  [FIND] 2410

Showing items 1 - 10 of 32                                                  1 2 3 4 [Next]

| | ID | Area | Sort | Text | | ActionURL |
|---|---|---|---|---|---|---|
| 1 | 37 | C | 0 | Have you participated in an early development, pre-construction meeting to evaluate potential civil site challenges? | 1004 | More Info |
| 2 | 19 | C | 2 | Has the civil engineer provided positive grades on each of the building lots? | 1004 | More Info |
| 3 | 20 | C | 4 | Has sufficient pad design been done to avoid excessive cut and fill beneath the building pads? | 1004 | More Info |
| 4 | 21 | C | 6 | Has the erosion control been addressed in the civil engineering report? | | |
| 5 | 22 | C | 8 | Has retaining structures been identified for this site? | | |
| 6 | 23 | C | 10 | Has civil engineer provided control of surface and subsurface water migration, if the potential exists? | 1004 | More Info |
| 7 | 24 | C | 12 | Have the final grades and drainage been validated as specified in the civil engineering design document? | 1004 | More Info |
| 8 | 29 | D | 0 | Does the tree canopy extend over the building site pad? | | |

| Hit # | Date & Time | Object Run | Query | Cookies |
|---|---|---|---|---|
| 1 | 11/26/02 - 10:37:00 | signup | GET: | valuedGuest=Yes\|010 |
| 2 | 11/26/02 - 10:37:50 | login | GET:<br>stateInfo=eLHcEjtacBbdajYq8833\|1 | valuedGuest=Yes\|010<br>safeSessionID=eLHcej |
| 3 | 11/26/02 - 10:38:07 | signup | GET: | valuedGuest=Yes\|010<br>safeSessionID=eLHcej |
| 4 | 11/26/02 - 10:38:57 | login | GET:<br>stateInfo=eLHcEjtacBbdajYq8833\|3 | valuedGuest=Yes\|010<br>safeSessionID=eLHcej |
| 5 | 11/26/02 - 10:39:29 | login | POST:<br>stateInfo=eLHcEjtacBbdajYq8833\|4<br>adminuser=demo<br>password=demo<br>runAction=Log In | valuedGuest=Yes\|010<br>safeSessionID=eLHcej |

MULTIDISCIPLINE SITE DEVELOPMENT AND RISK ASSESSMENT PROCESS

FIELD OF THE INVENTION

This invention relates to a mechanism for encourage collaboration between various disciplines and more particularly to an Internet software program to encourage collaboration between various disciplines related to land development and building construction projects.

BACKGROUND OF THE INVENTION

During the building of large construction projects, many professionals are required in order to quickly and efficiently develop the project.

A builder might typically have numerous consultations with civil, environmental, and structural engineers as well as land and site development professionals.

Information from each discipline is shared in order to coordinate various aspects of the construction project and reduce risks. A risk assessment "protocol" is usually developed to statistically and/or qualitatively address the risks at a particular site in order to reduce the degree of uncertainty. Currently, there is not an efficient method to manage such interdisciplinary consultations.

Prior art methods do not provide a user friendly, easily acceptable mechanism to assess site development risks and reduce the uncertainty of a construction project.

What is needed is a method that encourages collaboration between individuals within different disciplines. The method should allow information to be easily accessible to each individual. The method also needs to statistically and/or qualitatively address the known risks at a particular construction site and reduce the degree of uncertainty for a specific project.

SUMMARY OF THE INVENTION

The present invention provides an Internet-based software application designed to encourage collaboration between various disciplines related to land development and construction projects.

The software provides an inventory checklist of interdisciplinary and informational consultations which, when completed, reduces the risk related to site development.

The invention provides a "section" related to each discipline. Each section displays questions which are related to the disciplines. For instance, in the "civil engineering" section, questions are posed which relate to roads and streets, fill and cut, erosion control, drainage and grades in the location of the project. In the "site development" section, questions are posed which relate to grades, water, soil type, vegetation, fill, and homeowner maintenance. In the "environmental engineering" section, questions are posed which relate to historical usage at the project area. In the "structural engineering" section, questions are posed which relate to the design of the foundation system, slab thickness, steel usage and beam construction.

The questions are accessed and answered by a professional trained in the field. Once each of the questions has been answered, the invention accesses a database and displays "risks" which are related to the answers. The "risks" may include warnings and reminder messages related to certain topics such as pre-existing conditions, suggested meetings between various disciplines, or additional information which may be needed. These "risks" may be associated with email addresses from the database to promote communication between the various engineers within the contact database.

The invention displays the "risks" in a graphical display. The graphical display can include "warning indications" showing that the risks have not been addressed or "all clear" indications showing that the risks have been addressed. The graphical display provides an efficient and statistical method of evaluating risks associated with site development by visually scanning for a "warning" or "all clear" visual ques.

The present invention is an improvement over the prior art because it provides a graphical risk analysis based on answers to interdisciplinary questions related to site development. The present invention is also an improvement over the prior art because it is easily available to individuals in different progressions and encourages collaboration between them. The invention is also an improvement over the prior art because it provides a qualitative visual method of addressing known risks at a particular construction site to reduce the degree of uncertainty. Of course, other advantages are readily apparent to one skilled in the art.

The invention will be better understood from the following more detailed description taken in conjunction with the accompanying drawings.

DETAILED DESCRIPTION OF THE DRAWINGS

A better understanding of the invention can be obtained from the following detailed description of one exemplary embodiment as considered in conjunction with the following drawings in which:

FIG. 1 is a screen shot of the registration screen according to the present invention;

FIG. 10 is a screen shot of the civil screen according to the present invention;

FIG. 18 is a screen shot of the specific user screen according to the present invention;

FIG. 19 is a screen shot of the maintain questions screen according to the present invention;

FIG. 28 is a screen shot of the hit tracking screen according to the present invention;

Figure 29A:
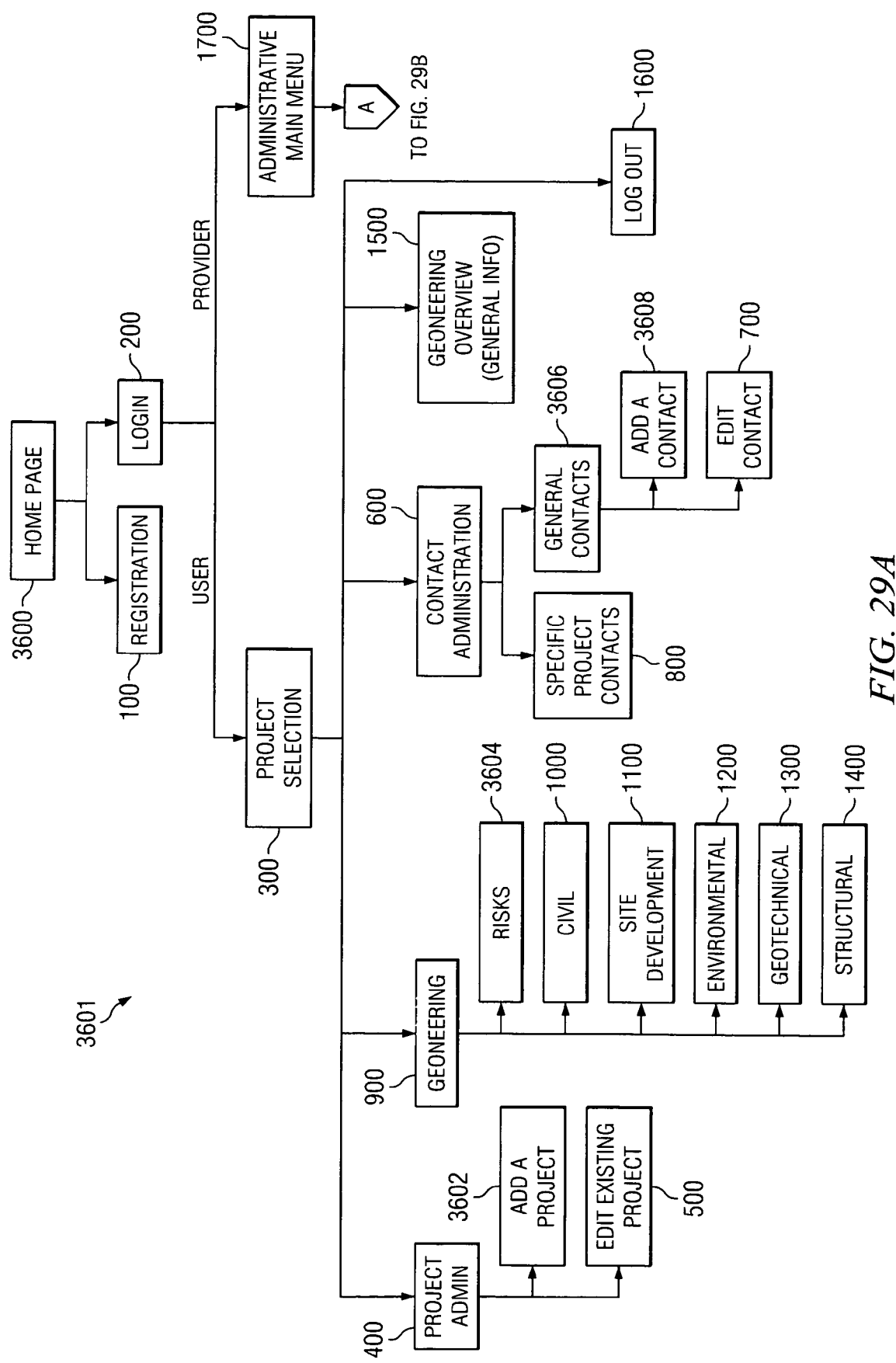
Figure 29B:
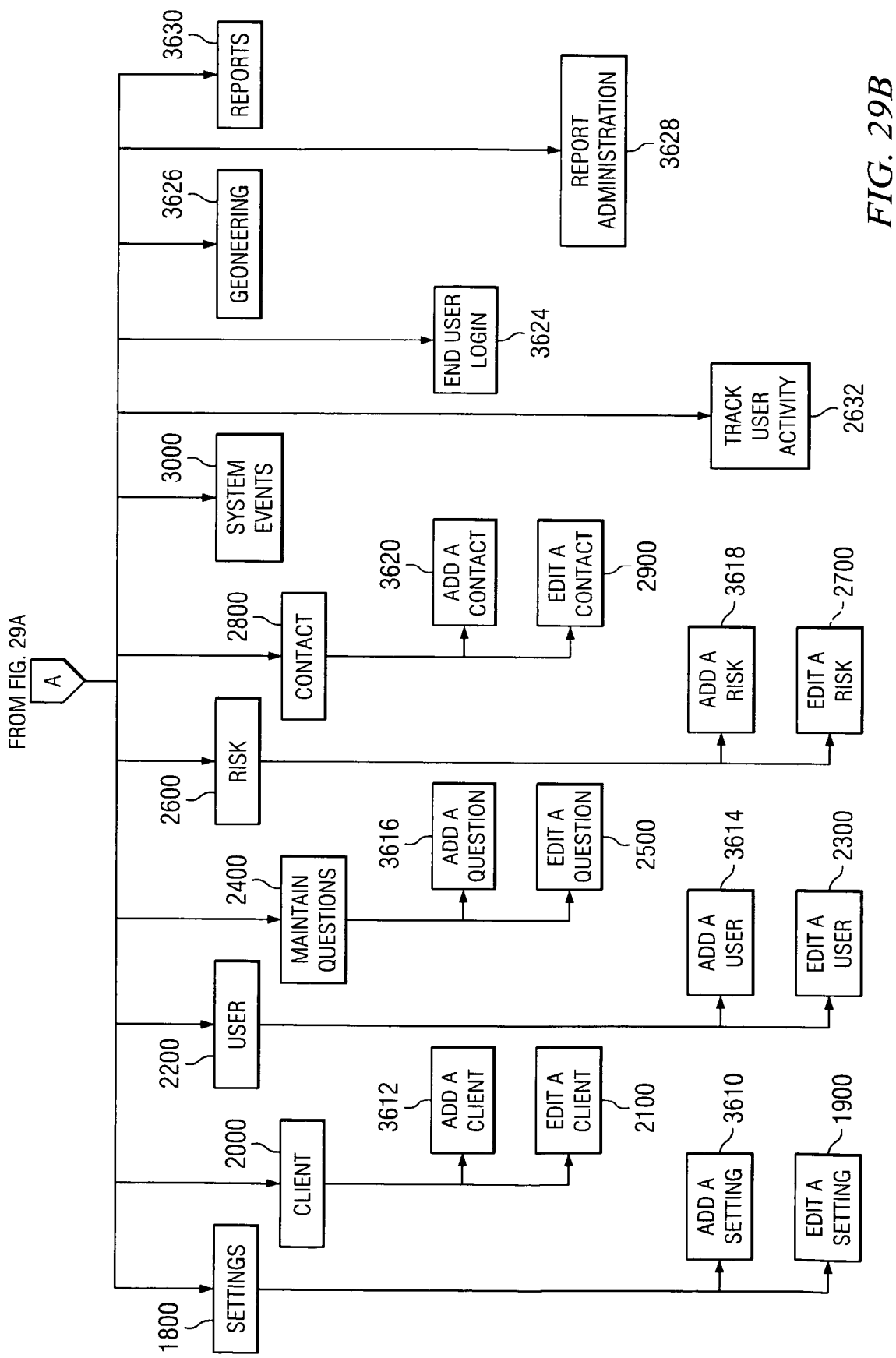
Figure 30:
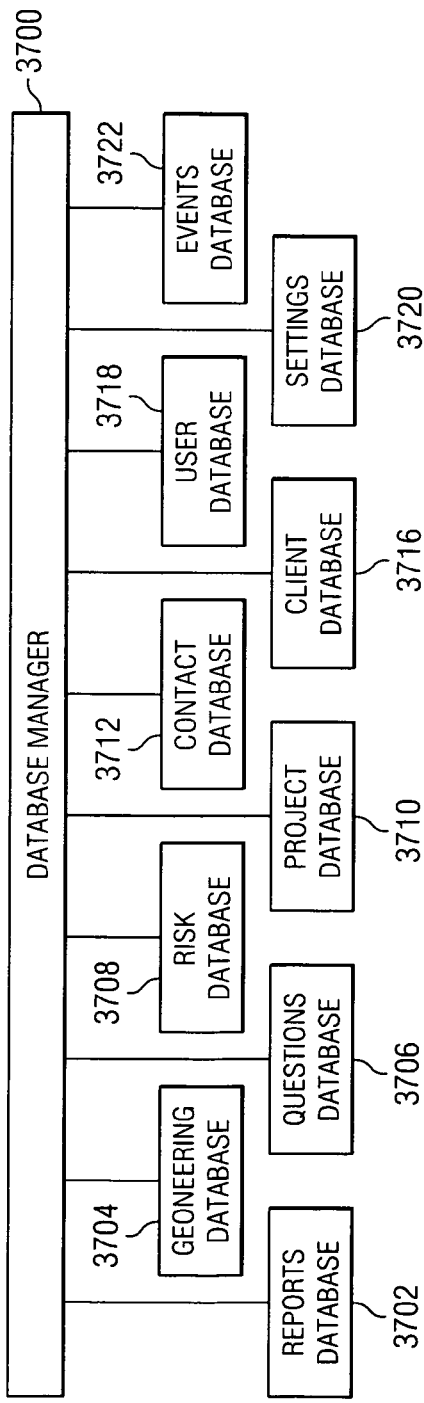
Figure 31:
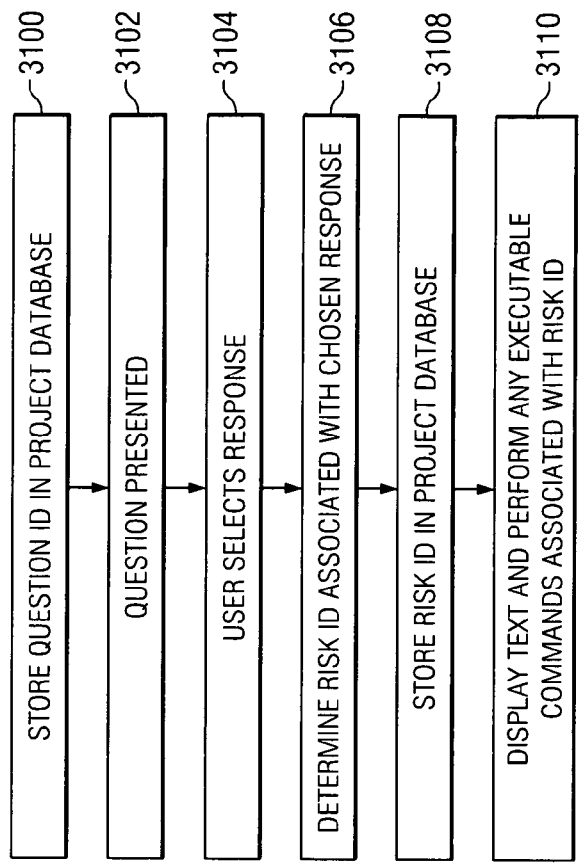

FIGS. 29a and 29b block diagrams of a geoneering system according to the present invention;

FIG. 30 is a block diagram of relational databases according to the present invention; and FIG. 31 is a flowchart of how a risk is generated according to the present invention.

DETAILED DESCRIPTION OF EXEMPLARY EMBODIMENTS

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

The preferred embodiment of the invention includes a system 3601, shown in FIG. 29A. The system 3601 requires the use of an HTTP-compliant web browser. Other embodiments could function without such a web browser. Known browser software includes Netscape and Netscape Navigator both available from Netscape Communications, Mountain View, Calif., Internet Explorer available from Microsoft Corp., Redman, Wash., and the like. The present invention is designed to operate within any of these known or developing web browsers. A RAM may also support other Internet services including simple mail transfer protocol or e-mail, file transfer protocol, network news transfer protocol or "Usenet", and remote terminal access.

System 3601 is controlled and maintained by a provider. The provider offers a service to a client utilizing system 3601. The provider accesses system 3601 through an administrator. An administrator is a user with full access to the system 3601 except fields that are locked. The administrator maintains system 3601 and inputs information such as the identity of the clients, the questions to be presented, and the risks associated with responses to the questions. The locked fields can only be accessed by a super administrator. The fields are locked when they are created and implemented into the system 3601. A super administrator has complete access to the entire system 3601. An example of a super administrator could be an IT director.

The client accesses system 3601 through one or more users. The user has access only to client specific information such as contacts and project information.

The preferred embodiment of the invention is executed on database manager 3700, FIG. 30. Database manager 3700 allows for the capability of controlling read/write access, specifying report generation, and analyzing usage of the data in all the databases. The database manager 3700 logic is based on WebSpeed® software as is known in the art. WebSpeed® software is available through Progress Software Corp. of Bedford Mass.

WebSpeed® is a development tool that contains both a front-end development component and a transaction server for interfacing to a new or existing database. WebSpeed® uses a scripting language for Web pages and delivers off data requests to a transaction processor. The transaction processor in turn runs queries against either an accompanying Progress DBMS available from Progress Software Corp., Bedford, Mass., or an existing IBM DB2 available from IBM Corporation, White Plains, N.Y., Informix, Oracle available from Orcale Corp, Redwood Shores, Calif., or an Open Database Connectivity ("ODBC")-compliant database. The data returned is then formatted according to the HTML and scripting on the appropriate Web page. Of course, other database management tools can be used to implement the invention.

In an alternate embodiment, the logic is based on Structured Query Language (SQL) as is known in the art. SQL is a standard language for making interactive queries from and updating a database such as IBM's DB2, Microsoft's Access available from Microsoft Corp., Redman, Wash., and database products from Oracle, Sybase located in Dublin, Calif., and Computer Associates located in Islandia, N.Y.

Database manager 3700 accesses reports database 3702, geoneering database 3704, questions database 3706, risk database 3708, project database 3710, contact database 3712, client database 3716, user database 3718, settings database 3720, and events database 3722. All the above databases are relational databases. They are populated with data provided by the administrator of the system.

Reports database 3702 contains reports generated by users. The reports can be displayed to a user when requested.

Geoneering database 3704 contains definitions of words and terms that can be displayed to a user when requested.

Questions Database 3706 contains a record for each question in the system 3601. Each record contains a field for a numerical question ID, a discipline the question is associated with, the order or place in a list the question appears when displayed to the user, the text of the question, a URL link to provide more information regarding the question, and the risk accessed when the user selects certain choices.

Risk database 3708 contains a record for each risk in the system 3601. Each record contains a field for a numerical risk ID, the discipline associated with the risk, the order or place in a list the risk appears when displayed, the text of the risk, a URL link to provide more information regarding the risk, an identifier for identifying if the risk has been completed or addressed, and a distribution list for listing what disciplines will be notified about the risk.

Project database 3710 contains a record for each project in the system 3601. Each record contains a field for a project name, a start date of the project, an end date of the project, a client associated with a project, questions to be answered related to the project, and the risks related to the answers to the questions.

Contact database 3712 contains a record for each contact in the system 3601. Each record contains a field for a numerical contact ID, a client the contact is associated with, the first and last name of the contact, a company the contact works for, an e-mail address of the contact, and a phone number of the contact.

Client database 3716 contains a record for each client in the system 3601. Each record contains a field for a numerical client ID and a client name.

User database 3718 contains a record for each user in the system 3601. Each record contains a field for a numerical user ID, a user name, a user password, the start date the user can access the system 3601, the last date the user can access the system 3601, whether or not the user has super administrator privileges, a client ID associated with the user, the failure count of the user, an identifier indicating if the user is an employee of a client or the provider of the system 3601, and a phone number of the user.

Settings database 3720 contains a record for each setting in the system 3601. "Settings" are guidelines, protocols, or rules governing the user's interaction with the system 3601. They are created by the administrator of the system. Examples can include how many days a user's session is open before it is archived, how long the system 3601 waits during a no activity period before a time out period is automatically initiated, and the number of login attempts a user is allowed before the system 3601 locks the user out. Each record contains a field for an account ID the setting applies to, the type of ID the setting applies to, such as all user's who are also clients, the type of setting, such as a general setting or a security setting, the setting name, a setting value, and a setting description.

Events database 3722 contains a record for every event that occurs on the system 3601. Each record contains a date and time of each event, the object run of the event, the query generated by the event, any cookies used by the event, the IP address of the browser where the event originated, the web address of where the event originated, and the ID of the computer from where the event originated.

FIGS. 29a and b depict a block diagram of the relationships between the databases and the associations provided by system 3601.

System 3601 is first accessed through provider's home page screen 3600, FIG. 29a. The provider's home page screen provides information about the provider and can offer hyperlinks to other services or products. From the provider's home page screen 3600, registration screen 100 or login screen 200 can be accessed. Registration screen 100 allows a user to enter information to obtain an ID and password. Before a user can log onto system 3601, an ID and password must be acquired. The login ID is used for billing purposes to track the number of times a user logs onto the system 3601, as an identifier to distinguish between users and administrators, and to retrieve client specific information stored in the project database 3710 and the contact database 3712.

After an ID and password are obtained, login screen 200 is accessed. Login screen 200 requires entry of the ID and password and allows for login to system 3601. Upon login, the database manager 3700, checks the entered ID and password against the information stored in the user database 3718 to determine if the ID and password are registered with system 3601. If the ID and password are found in the user database 3718, the user database 3718 will contain an identifier indicating if the ID is a user's ID or an administrator's ID.

If the ID and password match a user's ID and password, then project selection screen 300 is displayed and the client's information database 3204 is accessed to supply specific client information such as contacts and projects that one unique to the client and in system 3601. The specific client information accessed depends on what client the user is associated with. Project selection screen 300 allows the user to access project administration screen 400, geoneering screen 900, contact administration screen 600, geoneering overview screen 1500, and log out screen 1600.

Project administration screen 400 allows the user to delete an existing project from the projects database 3710, access add a project screen 3602, and access edit an existing project screen 500. Add a project screen 3602 allows the user to add a new project to the project database 3710. Edit an existing project screen 500 allows the user to edit an existing project in the project database 3710.

Geoneering screen 900 requires that questions related to a specific discipline be answered. "Risks" are generated by the answers provided to the questions and displayed. Geoneering screen 900 allows access to civil screen 1000, site development screen 1100, environmental screen 1200, geotechnical screen 1300, structural screen 1400, and risks screen 3604. Civil screen 1000 requires answers to questions related to civil planning. Site development screen 1100 requires answers to questions related to site development. Environmental screen 1200 requires answers to questions related to environment issues. Geotechnical screen 1300 requires answers to questions related to geotechnical issues. Structural screen 1400 requires answers to questions related to structural issues. Risks screen 3604 displays "risks" which are responsive to the answer of each question.

Contact administration screen 600 allows access to specific project contacts screen 800 and general contacts screen 3606. Specific project contacts screen 800 allows contacts to be assigned from the contact database 3712 to specific projects in the project database 3710.

General contacts screen 3606 allows deletion of an existing contact from the contact database 3712, access to the add a contact screen 3608 and access to edit contact screen 700. Add a contact screen 3608 allows the user to add a new contact to the contact database 3712. Edit contact screen 700 allows editing of existing contacts in the contact database 3712.

Figure 11:
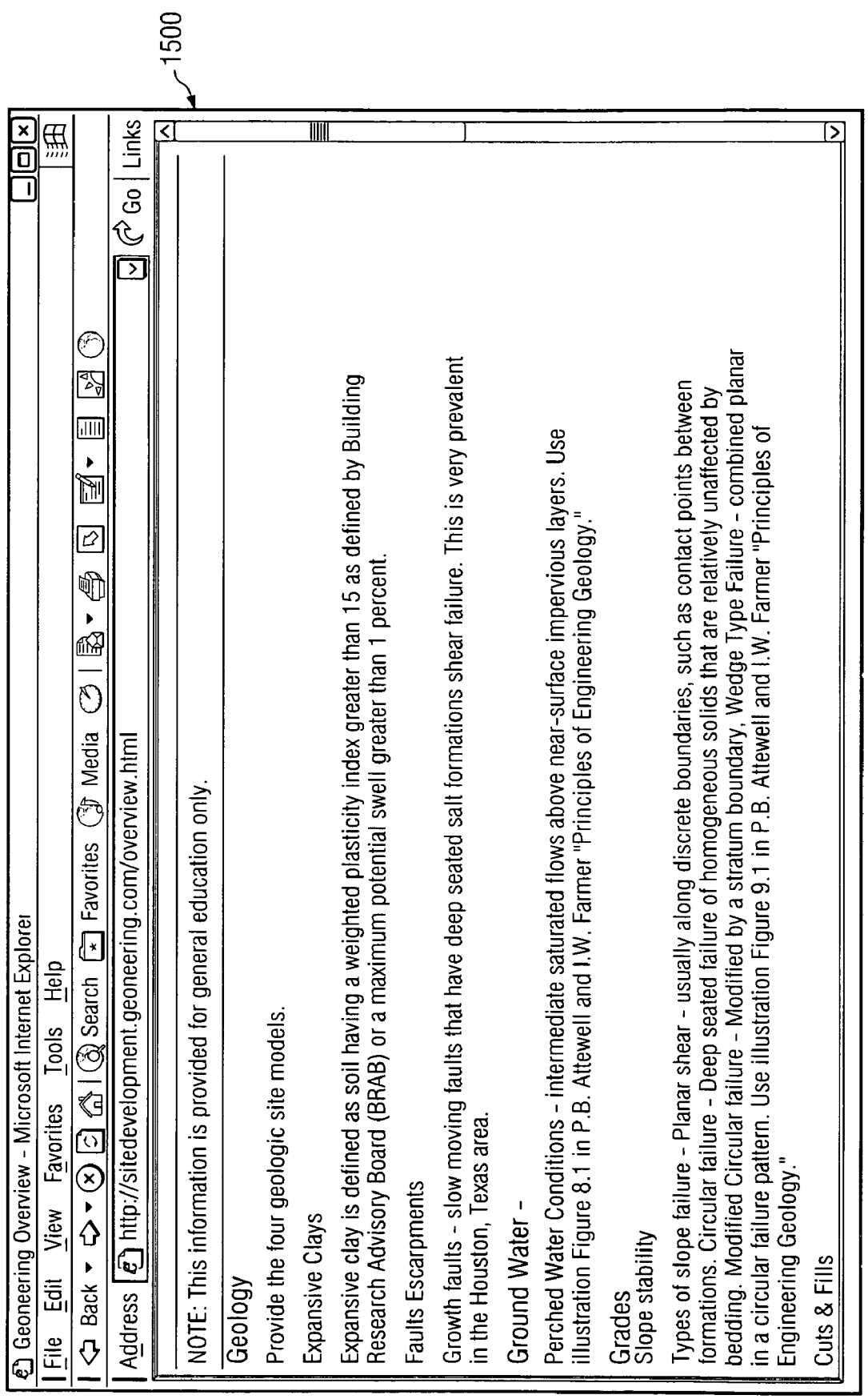
FIG. 11 is a screen shot of the geoneering overview screen according to the present invention.

Geoneering overview screen 1500 shown in FIG. 11, allows the user to access general information about site development topics. In a preferred embodiment, this information can be textual or graphical. Log out screen 1600 allows the user to log out of the system 3601. Log out screen 1600 displays a message such as "You have successfully logged out of the system" and provides hyperlinks for the user to log back into the system 3601 or go to the provider's home page screen 3600.

If the ID and password entered into login screen 200 match an administrator's ID and password, then administrative main menu screen 1700 is displayed. Administrative main menu screen 1700 allows access to settings screen 1800, (shown on FIG. 276b) client screen 2000, user screen 2200, question screen 2400, risk screen 2600, contact screen 2800, system events screen 3000, track user activity screen 2632, end user login screen 3624, geoneering screen 3626, report administration screen 3628, and reports screen 3630.

Settings screen 1800 allows the administrator to delete an existing setting from the setting database 3720, access the add a setting screen 3610, and access the edit a setting screen 1900. In the preferred embodiment, a "setting" is information related to system settings such as how many days a user's session is open before it is archived, how long the system 3601 waits during a no activity period before a time out period is automatically initiated, and the number of login attempts a user is allowed before the system 3601 locks the user out. Add a setting screen 3610 allows the administrator to add a new setting to the setting database 3720. Edit a setting screen 1900 allows the administrator to edit an existing setting in the setting database 3720.

Client screen 2000 allows the administrator to delete a client from the client database 3716, access add a client screen 3612 and access edit a client screen 2100. Add a client screen 3612 allows the administrator to add a new client to the client database 3716. Edit a client screen 2100 allows the administrator to edit an existing client in the client database 3716.

User screen 2200 allows the administrator to delete an existing user from the user database 3718, to access add a user screen 3614 and to access edit a user screen 2300. Add a user screen 3614 allows the administrator to add a new user to the user database 3718. Edit a user screen 2300 allows the administrator to edit an existing user in the user database 3718.

Question screen 2400 allows the administrator to delete a question from the questions database 3706, access add a question screen 3616 and access edit a question screen 2500. Add a question screen 3616 allows the administrator to add a new question to the questions database 3706. Edit a question screen 2500 allows the administrator to edit an existing question in the questions database 3706.

Risk screen 2600 allows the administrator to delete a risk from the risk database 3708, access add a risk screen 3618 and access edit risk screen 2700. Add a risk screen 3618 allows the administrator to add a new risk to the risk database 3708. Edit risk screen 2700 allows the administrator to edit an existing risk in the risk database 3708.

Contact screen 2800 allows the administrator to delete an existing contact from the contact database 3712, access add a contact screen 3620 and access edit a contact screen 2900. Add a contact screen 3620 allows the administrator to add a new contact to the contact database 3712. Edit a contact screen 2900 allows the administrator to edit an existing contact in the contact database 3712.

System events screen 3000 allows the administrator to view events that have occurred on the system 3601 by accessing the events database 3722. An event is any action the user or administrator does that initiates a response from the system 3601.

Track users activity screen 2632 allows the administrator to track a user's activity for troubleshooting session information.

End-user login screen 3624 allows the administrator to login as a user. When an administrator logs in through end-user login screen 3624 the project selection screen 300 is displayed. An administrator may login as a user to test and debug the system 3601.

Geoneering screen 3626 allows the administrator to access the geoneering database 3704 and add, delete or modify the geoneering terms stored in geoneering database.

Reporting administration screen 3628 allows the administrator to design reports using a standard query and reporting engine. A standard query and reporting engine has access to all the databases in the system 3601 via database manager 3700. In the preferred embodiment, the standard query and reporting engine uses Congos® by Impromptu of Burlington, Mass., Crystal® by Crystal Software of Wantirna, Victoria, Australia, or other software known in the art for creating tables and charts from relational databases.

For example, a query report may be generated for projects of a specific client which have been completed in a specific month. To create such a report, the system 3601, through the database manager 3700, queries the project database 3710 for all projects that have an end date of the specified month for the specific client. The projects that have been completed in the specific month for the specific client are then stored in the reports database 3702 and can be viewed from reports screen 3630.

Useful report types in the preferred embodiment can include reports such as a listing of clients with contact information, a listing of all contacts associated with a client, or a listing of all outstanding risks associated with a client or project. Relational database managers are well known in the art for being able to associate and report information contained within relational databases. Reports screen 3630 allows the administrator to access the reports database 3702 to view generated reports.

Client Users

Figure 1:
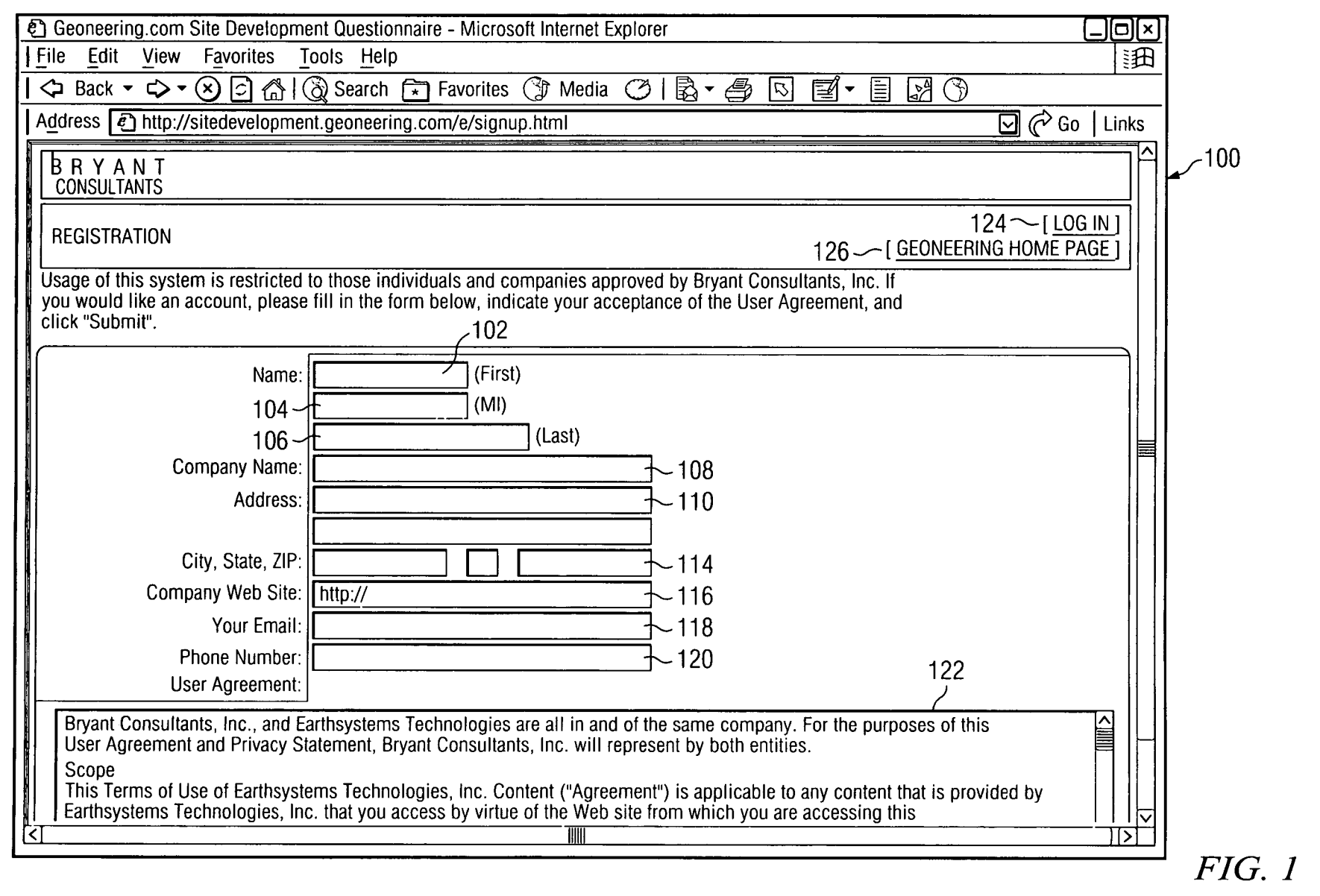

A login ID and password is acquired through registration screen 100, FIG. 1. Also, a login ID and password may be obtained from and set by a system's administrator.

Registration screen 100, FIG. 1, contains a form to be completed by a user. The form includes contact information and a user agreement. The user's name is entered into first name box 102, middle initial box 104, and last name box 106. The client or company information associated with the user is entered into company name box 108, company address box 110, and city, state and zip box 114. Additional information may be entered into company web site box 116, users e-mail address box 118, and users phone number box 120.

Once all the necessary information is entered, acceptance of user agreement 122 must be indicated. User agreement 122 is a typical click agreement and acceptance of the agreement is indicated through a process known in the art such as selecting "yes" and then "clicking" or selecting a next or submit button.

After the user's contact information has been entered and the user agreement has been accepted, the information entered into registration screen 100 is sent to the provider through a process known in the art such as e-forms, web-form, or coded e-mail for approval. If the user is approved and the client associated with the user is not already in the client database 3716, the provider sets up an account for the client, adds the client to the client database 3716, adds the user to the user database 3718 and the user is sent an ID and a password via e-mail. If the client associated with the user is already in the client database, then the user is added to the user database 3718 and the user is sent an ID and a password via e-mail.

In the preferred embodiment, the administrator reviews the information entered into registration screen 100 and decides whether or not to approve the user. In another embodiment, user approval is automatic and based on the user entering all the desired information and accepting the click agreement. In the second embodiment, the system 3601 would automatically add the client information to the client database 3716, the user information to the user database 3718 and communicate an ID and password to the user.

Once the user has been approved, the user may be billed a one time initiation fee or billed monthly based on usage of the system 3601. For example, the client may be charged a fee based on the number of user logins. The number of times a user logs in can be traced from the events database 3722 by searching the events database 3722 for the user's login ID. The fee charged may be a flat fee for the first n number of logins and then an additional fee for each login after m times, where n and m are any number.

Also, a fee may be charged for the number of users a client may have. For example, a large client may have many users who access and use the system 3601. All client users are tied to a client by the client identifier stored in the user database 3718. A report could be generated based on the number of users a client has and the number of times each user accessed the system 3601.

Figure 2:
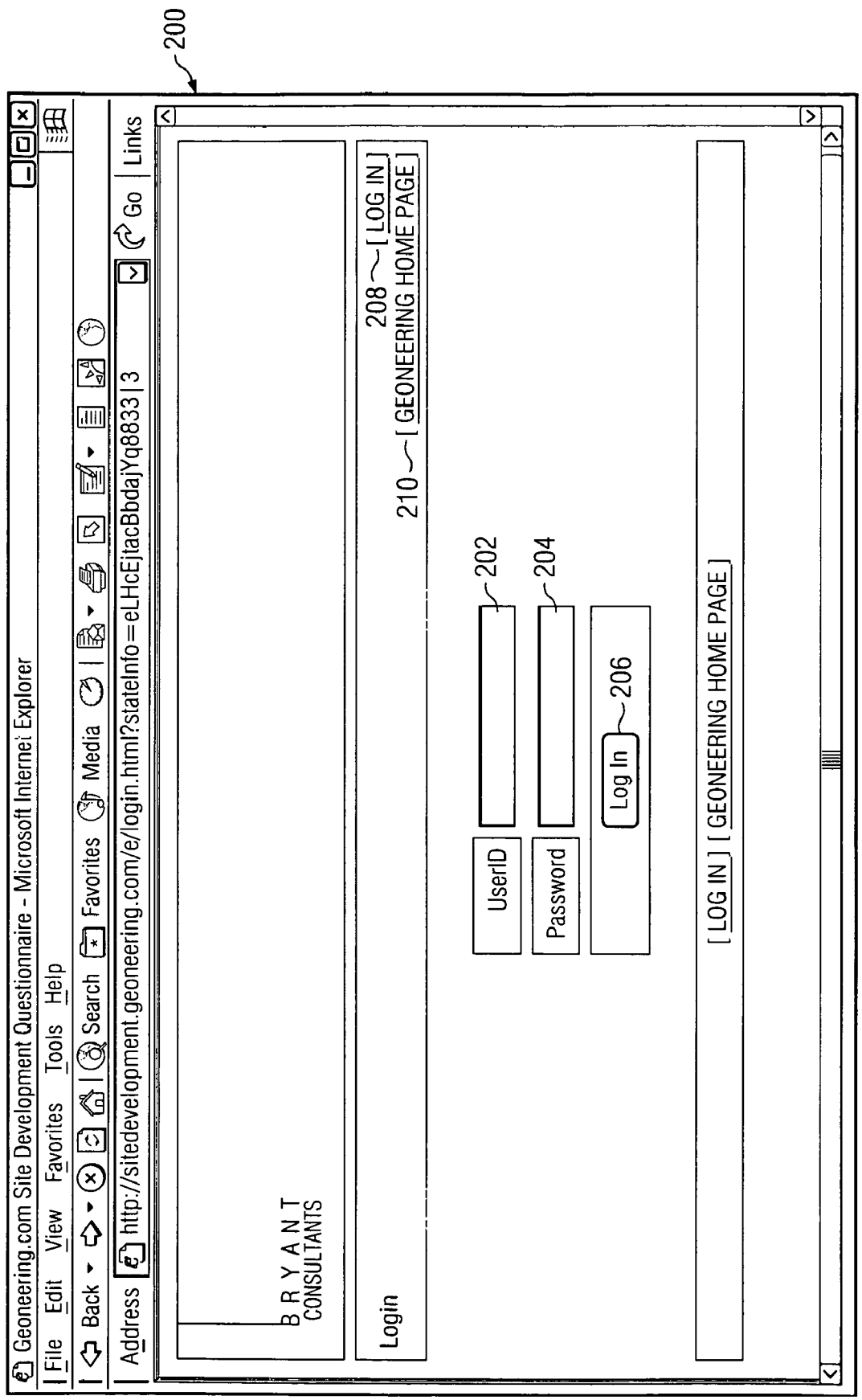
FIG. 2 is a screen shot of the login screen according to the present invention.

Registration screen 100 also contains log in tab 124 and home page tab 126. Home page tab 126 accesses home page screen 3600. Login tab 124 allows the user to log onto the system 3601. Login tab 124 accesses login screen 200, FIG. 2.

Figure 3:
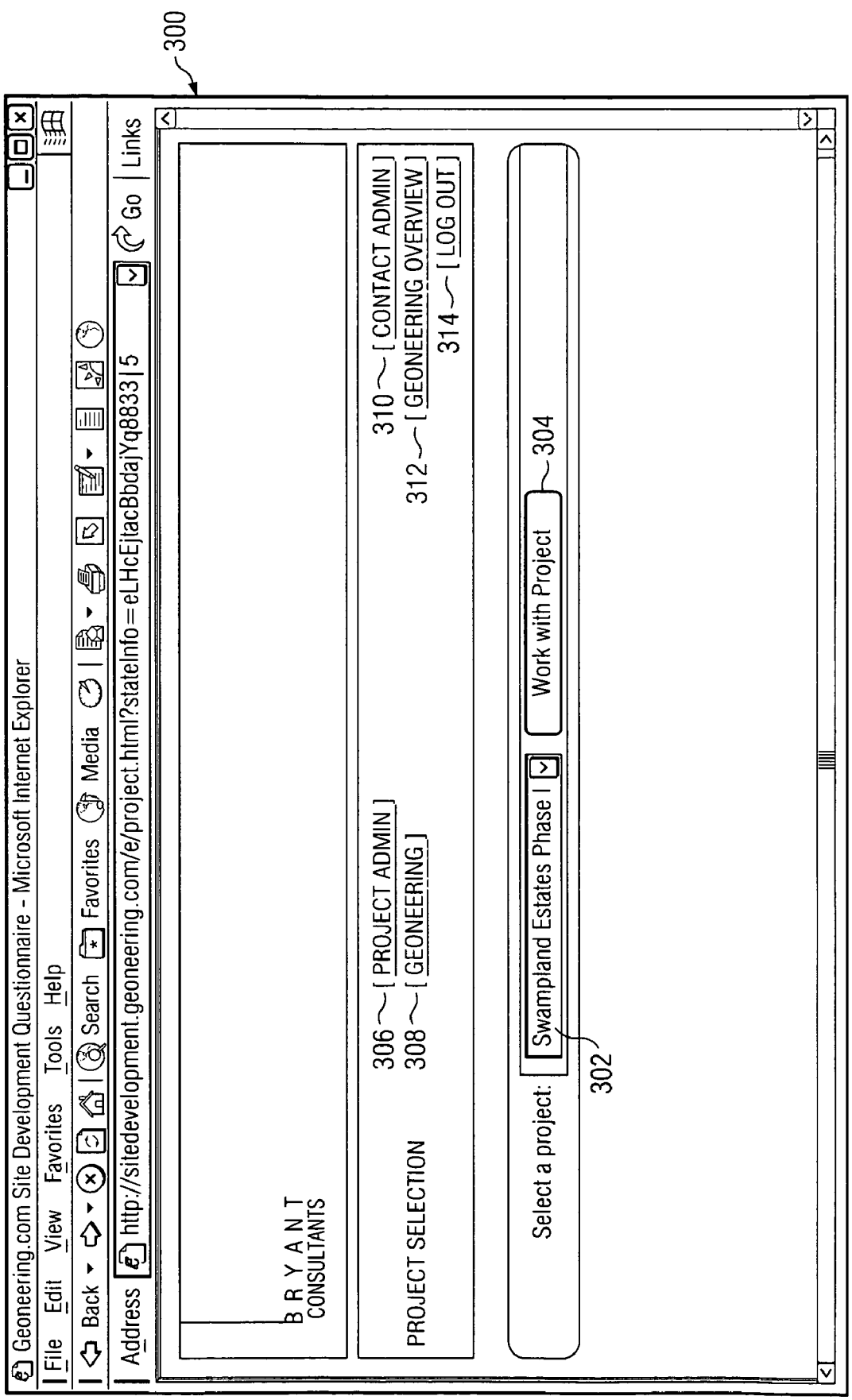
FIG. 3 is a screen shot of the project selection screen according to the present invention.

Login screen 200 contains user ID box 202 for the user to input his login ID and password box 204 for the user to input his password. In another embodiment, the password can be changed by the user once the user has successfully entered the system 3601. To change the password, the user would access a separate screen that prompts the user to enter the new password. The new password replaces the old password in the user database 3718. After entry of the login ID and password the login button 206 is selected which accesses the user database 3718 to determine if the entered ID and password are registered with the system 3601. Upon authentication that the login ID and password are registered with the system 3601, the user is taken to project selection screen 300, FIG. 3, which displays projects associated with the user.

Screen 2100 also contains log in tab 208 and home page tab 210. Home page tab 210 accesses home page screen 3600. Login tab 208 allows the user to log onto the system 3601. Login tab 124 accesses login screen 200.

Project selection screen 300 contains drop down menu 302. Drop down menu 302 allows the user to select a specific project from project database 3710. All the projects stored in the project database 3710 have a record for containing a client ID. A query for all the projects in the project database 3710 having the same client ID as the user logged into the system 3601 produces all the projects to be listed in drop down menu 302. If the search of the project database does not produce any projects associated with the client ID, then the add a project screen 3602 is accessed so the user can add a project to the project database 3710. Once a project is selected from drop down menu 302, work with project button 304 allows the user to access the geoneering screen 900 to answer questions regarding the selected project.

Figure 4:
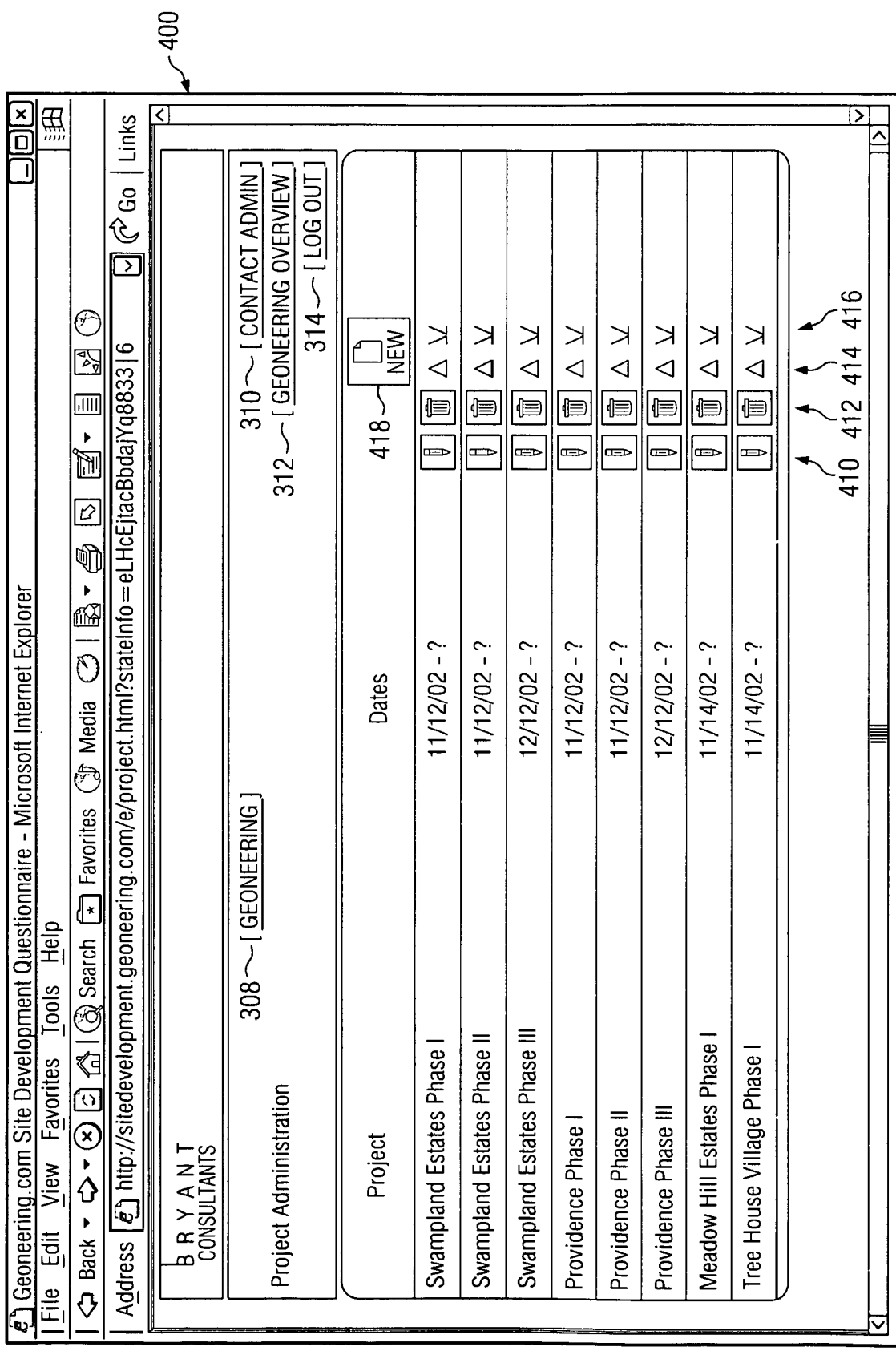
FIG. 4 is a screen shot of the project administration screen according to the present invention.

Project selection screen 300 also contains project administration tab 306, geoneering tab 308, contact administration tab 310, geoneering overview tab 312, and log out tab 314. Project administration tab 306 allows the user to access the project administration screen 400 where administrative changes to projects are performed. Geoneering tab 308 allows the user to access the geoneering screen 900 where questions related to various disciplines are presented to the user and potential risks to the project are generated and displayed based on the user's answers to the questions. Contact administration tab 310 allows the user to access the contact administration screen 600 where the user can access a general contacts list and add, delete, or edit contacts as well as assign contacts to specific projects. Geoneering overview tab 312 allows the user to access the geoneering overview screen 1500 where general information about geoneering terms and concepts used throughout the system 3601 can be obtained. Log out tab 314, logs the user out of the system 3601 and accesses the log out screen 1600. Project administration tab 306 allows the user to access project administration screen 400, FIG. 4.

Project administration screen 400 allows the user to modify or delete an existing project or to create a new project. Project administration screen 400 contains geoneering tab 308, contact administration tab 310, geoneering overview tab 312, and log out tab 314.

Project administration screen 400 also contains new project icon 418. New project icon 418 allows the user to add a new project to the project database 3710. New project icon 418 accesses the add a project screen 3602, to be described later. Project administration screen 400 also displays a list of projects accessible to the user. For each accessible project, the name of the project and the anticipated start and end date of the project is listed. If the start or end date of the project is unknown, then a question mark is displayed in place of the start or end date.

Figure 5:
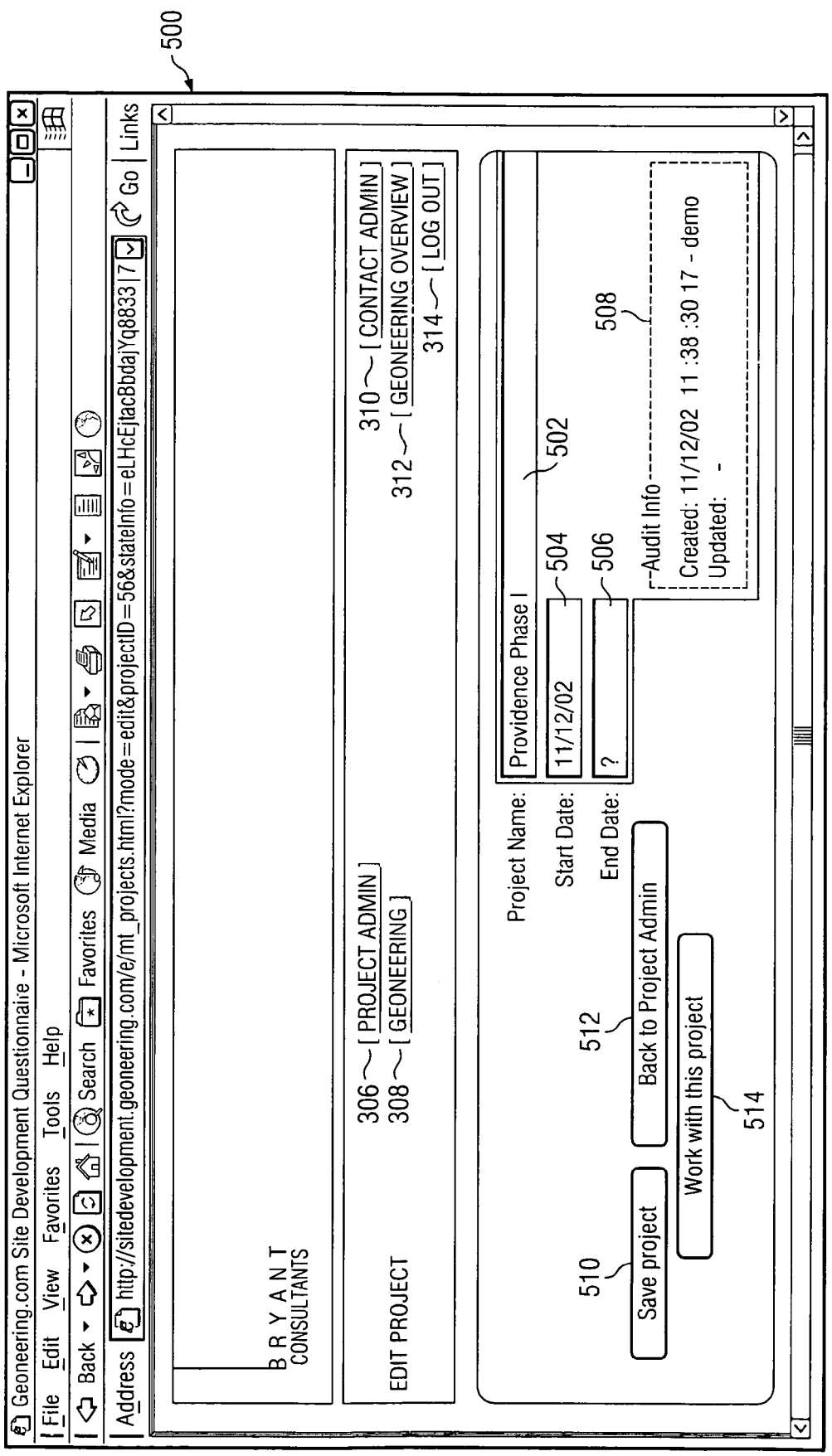
FIG. 5 is a screen shot of the edit project screen according to the present invention.

Proximate to each project name is edit project icon 410, delete project icon 412, move up in priority icon 414, and move down in priority icon 416. Delete project icon 412 deletes the corresponding project from the project database 3710. Move up in priority icon 414 moves the corresponding project up the displayed list of projects. Move down in priority icon 416 moves the project down the displayed list of projects. The move up in priority icon 414 and move down in priority icon 416 changes where or in what order the project is listed in the drop down menu 302. The order in which the project is listed is stored in the project database 3710. Edit project icon 410, allows the client to access edit an existing project screen 500. Upon selection of the edit projection 410, the database manager 3700 searches the project database 3710 for the project corresponding to the selected edit project icon 410. The information in the project database 3710 relating to the corresponding project is displayed on edit an existing project screen 500, shown on FIG. 5.

Edit an existing project screen 500 contains project name box 502 for the user to edit the name of the project, start date box 504 for the user to edit the start date of the project, and end date box 506 for the user to edit the end date of the project.

Edit an existing project page 500 also contains audit information box 508 which displays the earliest and latest date the project was modified. To obtain the earliest and latest date, the database manager 3700 queries the events database 3722 for all events related to the displayed project. Then, using the WebSpeed® software, the system 3601 sorts the dates of the events relating to the displayed project and displays the earliest and latest date that the project was modified.

Edit an existing project screen 500 also contains save project button 510, back to project administration button 512, and work with this project button 514. Save project button 510 saves the information displayed in project name box 502, start date box 504 and end date box 506 into the project database 3710. Back to project administration button 512, accesses the project administration screen 400. Work with this project button 514 accesses the geoneering screen 900.

The add a project screen 3602 is similar to edit an existing project screen 500 except in the add a project screen 3602, the project name box 502, start date box 504 and end date box 506 are blank. After the desired information is entered into each box, and upon selection of save project button 510, the information displayed in each box is saved in the project database 3710 resulting in a new project being added to the project database 3710.

Figure 6:
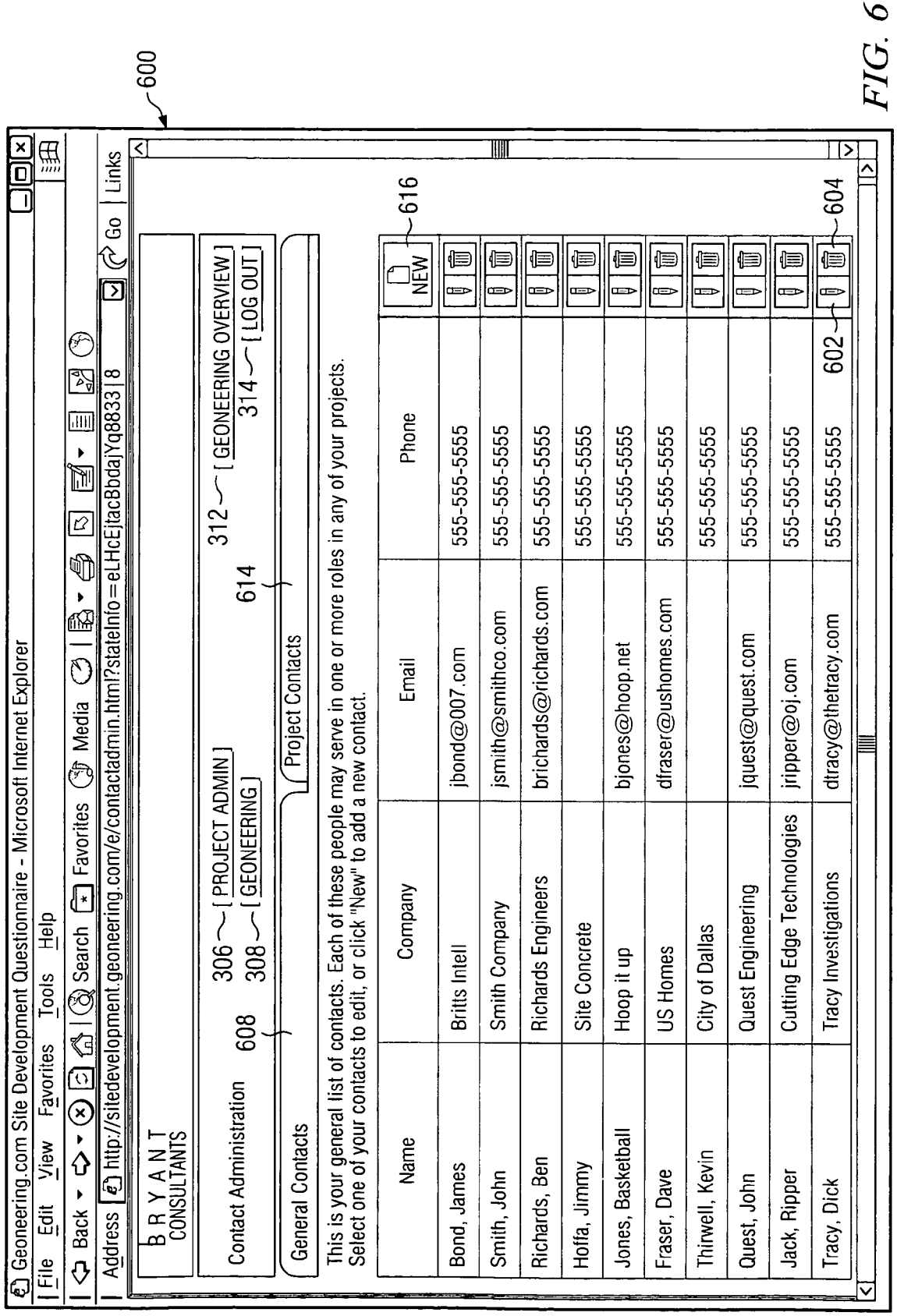
FIG. 6 is a screen shot of the contact administration screen according to the present invention.

Also displayed on edit an existing project screen 500 are project administration tab 306, geoneering tab 308, contact administration tab 310, geoneering overview 312, and log out tab 314. Contact administration tab 310 allows the user to access contact administration screen 600, FIG. 6.

Contact administration screen 600 contains project administration tab 306, geoneering tab 308, geoneering overview tab 312, and log out tab 314. Contact administration screen 600 also contains general contacts folder 608 and project contacts folder tab 614. General contacts folder 608 accesses the contact database 3712 and displays a general list of all contacts associated with users logged into the system 3601. The contacts are listed by their name, company, e-mail address and phone number. General contacts folder 608 contains new contacts icon 616. New contacts icon 616 accesses the add a contact screen 3608, to be described later.

Figure 7:
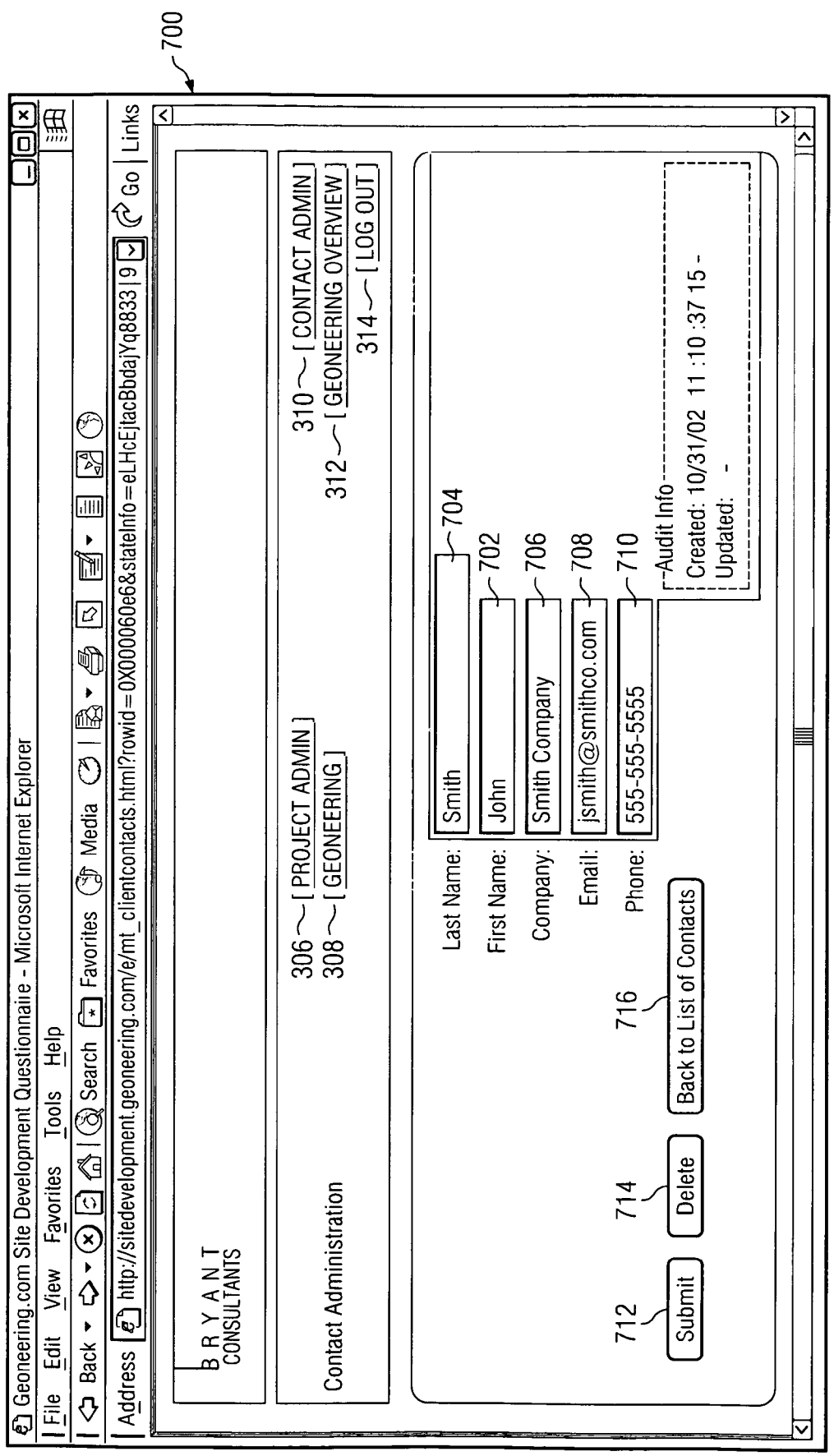
FIG. 7 is a screen shot of the edit contact screen according to the present invention.

Proximate to each contact is edit contact icon 602 and delete contact icon 604. Delete contact icon 604 deletes the corresponding contact from the contact database 3712. Edit contact icon 602 accesses the edit contact screen 700, FIG. 7 and allows the user to edit the corresponding contact.

Upon selection of the edit contact icon 602, the database manager 3700 searches the contact database 3712 for the contact corresponding to the selected edit contact icon 602. The information in the contact database 3712 relating to the corresponding contact is displayed on edit contact screen 700.

Edit contact screen 700 contains contact's first name box 702 which displays the contacts first name, last name box 704 which displays the contacts last name, company box 706 which displays the name of the contact's company, e-mail box 708 which displays the contact's e-mail address, and phone number box 710 which displays the contact's phone number.

Edit contact screen 700 also contains submit icon 712, contact delete icon 714, and back to contacts list icon 716. Submit icon 712 saves the information displayed on edit contact screen 700 into the contact database 3712. Contact delete icon 714 deletes the displayed contact's information from the contact database 3712 and the contact is removed from the general contact list and any specific projects the contact is assigned to. Back to contacts list icon 716 accesses the contact administration screen 600.

The add a contact screen 3608 is similar to edit contact screen 700 except in the add a contact screen 3608, contacts first name box 702, last name box 704, company box 706, e-mail box 708, and phone number box 710 are blank. After the desired information is entered into each box and upon selection of submit icon 712, the information displayed in each box is saved in the contact database 3712 resulting in a new project being added to the contact database 3712.

Edit contact screen 700 also contains project administration tab 306, geoneering tab 308, contact administration tab 310, geoneering overview 312, and log out tab 314. Contact administration tab 310 accesses the contact administration screen 600.

Figure 8:
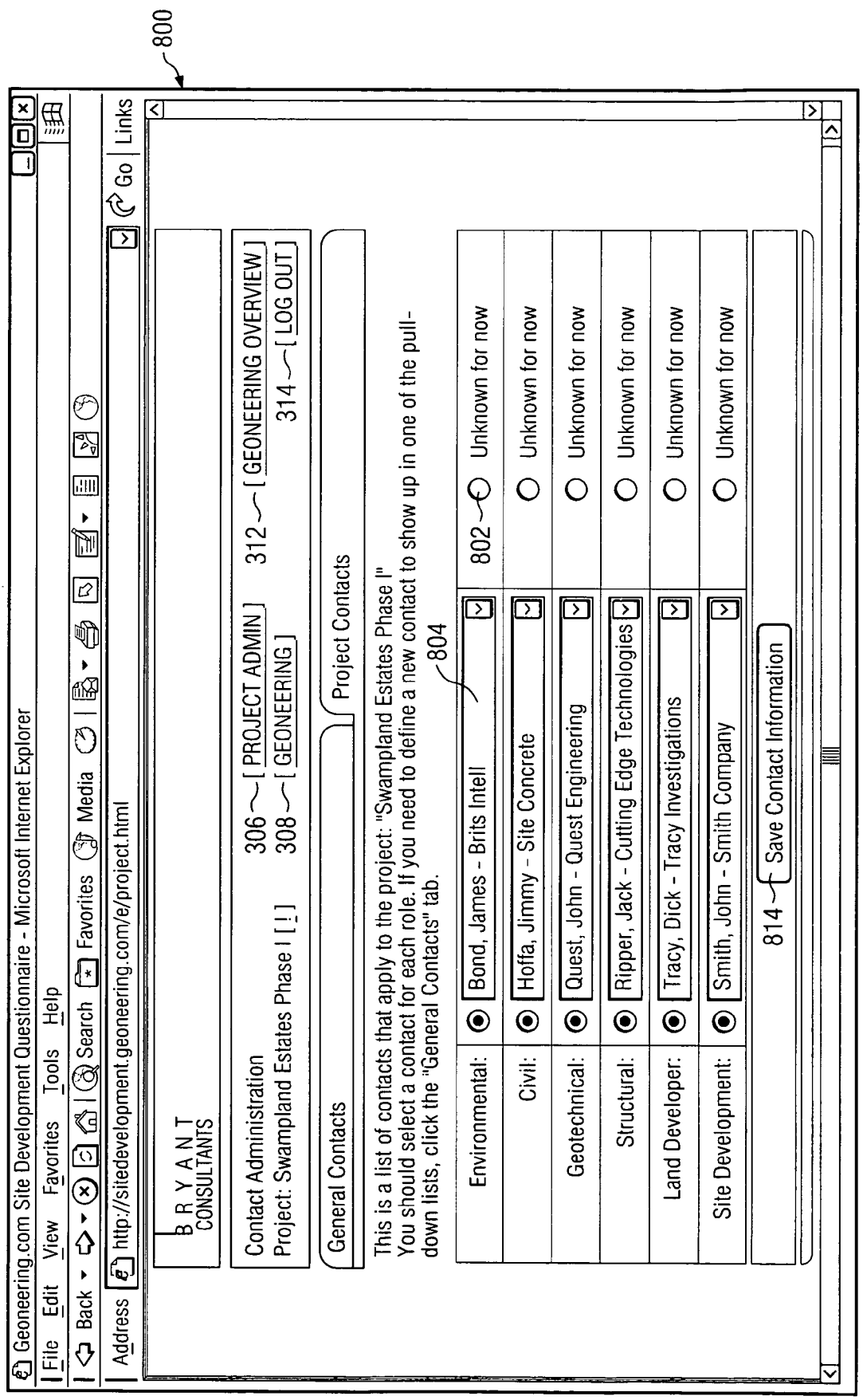
FIG. 8 is a screen shot of the project contacts screen according to the present invention.

Contact administration screen 600 allows access to project contacts folder 614. Project contacts folder tab 614 lists all the contacts for a specified project. The project contacts folder tab 614 allows access to specific project contacts screen 800, FIG. 8.

Specific project contacts screen 800 displays a list of contacts that have been assigned for each area or discipline of the project earlier selected from the project selection screen 300. For each discipline, drop down menu 804 allows the user to select a contact. Drop down menu 804 provides a listing of all the client's contacts in the contact database 3712. Save contact information icon 814 saves the displayed contact for each discipline of the selected project in project database 3710, thereby associating a contact with a specific discipline for the selected project. If a contact for a specific discipline is unknown, then the unknown for now button 802 is selected and no contact is assigned to that discipline. A blank space or language such as "please select a contact" will be displayed in drop down menu 804.

Figure 9:
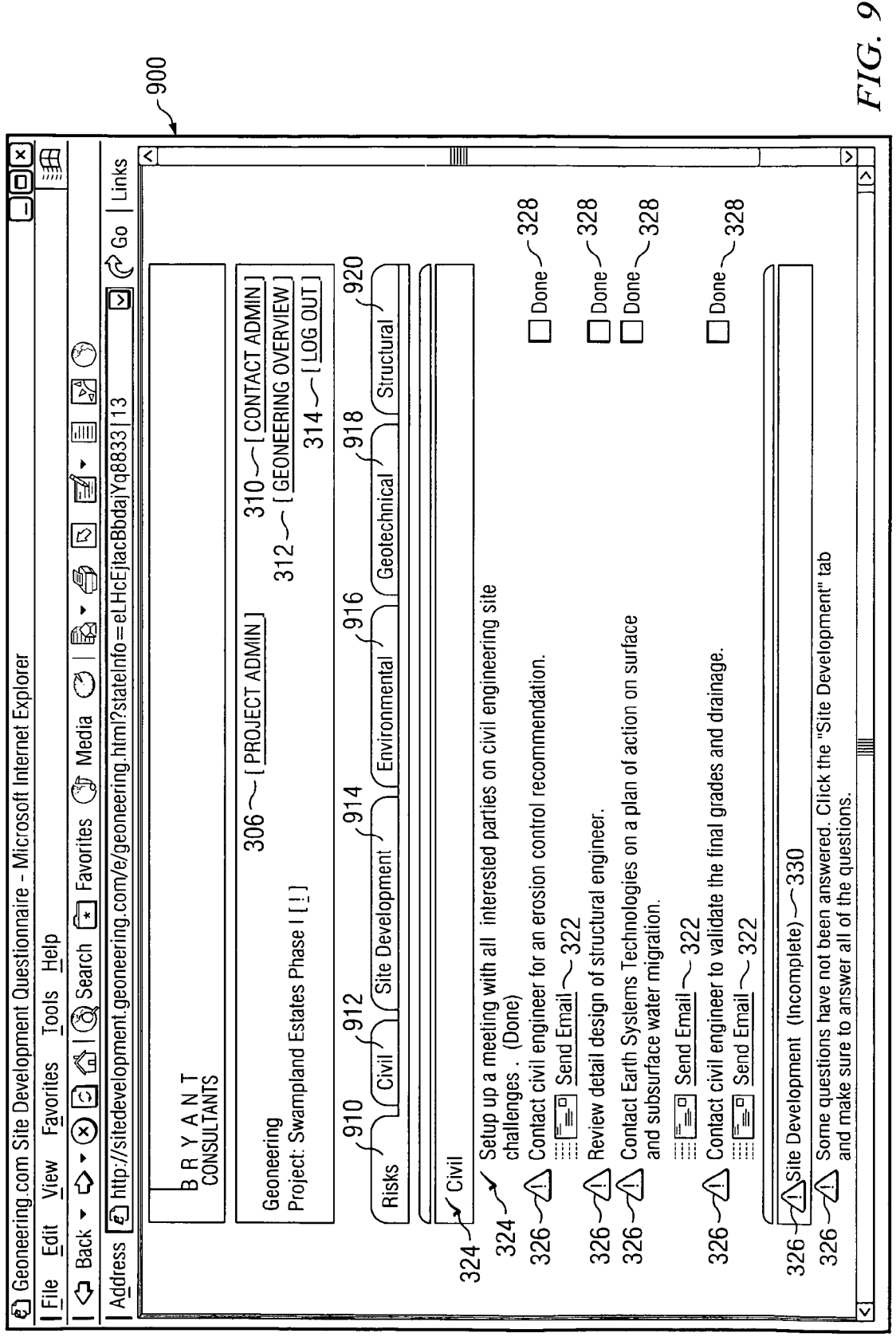
FIG. 9 is a screen shot of the geoneering screen according to the present invention.

Specific project contacts screen 800 also contains project administration tab 306, geoneering tab 308, geoneering overview 312, and log out tab 314. Geoneering tab 308 allows the user to access geoneering screen 900, FIG. 9.

Geoneering screen 900 contains risk folder 910, civil folder 912, site development folder 914, environment folder 916, geotechnical folder 918, and structural folder 920. Geoneering screen 900 also contains project administration tab 306, contact administration tab 310, geoneering overview 312, and log out tab 314. The functions of these tabs are the same as previously described.

Risk folder 910 graphically groups and displays risks which have been generated by the client's response to the questions in the civil folder 912, site development folder 914, environmental folder 916, geotechnical folder 918 and structural folder 920. The risks displayed in risk folder 910 are derived from a query to project database 3710 for all risks associated with the project earlier selected from the project selection screen 300. The generated risks are tasks for the user to perform.

In the preferred embodiment, the graphical presentation of the risks includes yellow warning signs 326 indicating the corresponding risk has not been completed and green check marks 324 indicating that the corresponding risks has been completed. Done box 328 allows the user to select the risks that have been addressed or completed. The risk folder allows the user to view a graphical risk analysis totaling the number of check marks 324 and the number of warning signs 326 displayed. The larger the number of unchecked risks the greater amount of risk to the completion of the project.

If all of the questions for a specific discipline have not been answered, then a yellow warning sign 326 is displayed next to a discipline heading 330 to indicate that the discipline is incomplete and not all of the questions for that discipline have been answered. If all of the questions have been answered then a green check mark 324 is displayed next to the discipline heading 330 to indicate that the discipline is complete and all of the questions for that discipline have been answered. The risks are grouped together by discipline and then listed under the appropriate discipline heading 330. Each discipline has a heading. A window scroll bar allows the user to access all of the displayed risks.

If one of the generated risks requires the user to contact a contact person for a specific discipline, and a contact has been assigned to that discipline, then the user may click send e-mail icon 322 to send that assigned contact an e-mail requesting assistance with the associated risk. Upon selection, E-mail icon 322 opens the user's default e-mail account to send an e-mail and accesses the contact database 3712 to obtain the contact's e-mail address. The system 3601 then inserts the e-mail address of the contact into the "to" field of the e-mail and the user enters the text of the e-mail. To determine whether or not to display send e-mail icon 322, the system 3601, using the database manager 3700 queries the contact field for the appropriate discipline to determine a contact has been assigned to the discipline. If a contact has been assigned to the discipline, then send e-mail icon 322 is displayed.

Each risk in risk database 3708 contains a distribution list indicating one or more disciplines with which the risk is associated. For example, if a risk is associated with the civil, environmental, and structural disciplines, and a specific contact and e-mail address has been assigned to each one of the disciplines, upon selection of the e-mail icon 322, the system 3601 will prepare an e-mail to send to each one of the contacts for each discipline. In another embodiment, the system 3601 may automatically send an e-mail message complete with text to the assigned contacts regarding the risk. The text would be stored in the risk database 3708.

Civil folder 912 contains a list of questions relating to the civil engineering aspects of the project. Such questions may include: Have you participated in an early development, pre-construction meeting to evaluate potential civil site challenges? Has the civil engineer provided positive grades on each of the building lots? Has sufficient pad design been done to avoid excessive cut and fill beneath the building pads? Has the erosion control been addressed in the civil engineering report? Have retaining structures been identified for this site? Has the civil engineer provided control of surface and sub-surface water migration, if the potential exists? Have the final grades and drainage been validated as specified in the civil engineering design document?

Site development folder 914 contains a list of questions relating to the development of the project site for the user to answer. Such questions may include: Does the tree canopy extend over the building site pad? Have there been prior roads, fences, and trails that existed at this site? Does this site have expansive soils? Does this site have excessive elevation changes? Have there been cuts or fills on pads that exceed five feet? Are there proper positive drainage grades away from the homes? Are there variable soil types at this site? Is there known surface or subsurface water present at this site? Have the homeowners been informed about the importance of proper maintenance?

Environmental folder 916 contains a list of questions relating to the environment surrounding the project site for the user to answer. Such questions may include: Have you participated in an early development, pre-construction meeting to evaluate potential environmental site challenges? Have aerial photographs and other applicable maps been reviewed to access present and prior land usage? Have there been any environmental issues that need to be communicated at this site?

Geotechnical folder 918 contains a list of "ground related" questions for the user to answer. Such questions may include: Have you participated in an early development, pre-construction meeting to evaluate potential geotechnical site challenges? Has a geotechnical report that included all available sub surface information been provided to you? Have there been a sufficient number of spatial densities of soil boring to characterize the soils at the site? Were the grading operations complete prior to the geotechnical investigation? Has the placement of fill been tested for density and moisture content? Have any known or expected unfavorable site and sub surface conditions been identified at this site? Has the geotechnical report provided recommendations for foundation systems, and have associated risks been defined for each? Has the geotechnical report provided suitable design parameters for the foundation system? Have soil treatment options been identified and recommended in the geotechnical report?

Structural folder 920 contains a list of questions relating to the structure or building for the user to answer. Such questions may include: Have you participated in an early development, pre-construction meeting to evaluate potential structural site challenges? Have you received a structural plan from the structural engineer? Have you had a pre-pour verification of conformance of the as-built conditions with the foundation design? Have you had a post-pour verification of conformance of the as-built conditions with the foundation design?

Civil folder 912 allows the user to access civil screen 1000, FIG. 10. Civil screen 1000 displays the questions contained in civil folder 912. Proximate to each question is more info tab 1004, yes button 1006, no button 1008, don't know button 1010, and skip for now button 1012. More info tab 1004 is a hyperlink that accesses a separate screen or URL containing information linked to the question. The separate screen displays more information about the question. For example the information in the separate screen could be a definition of a word, power point presentation, or a video clip giving the user more information regarding the question.

As shown in FIG. 31, when the user accesses civil screen 1000, the question ID for each question contained in civil folder 912 is stored in the project database 3710, step 3100. Then a question is displayed to the user, step 3102. The questions can be displayed to the user one at a time or may be displayed as a list. Next, the user selects a response to the question by selecting the "yes" button 1006, "no" button 1008, "don't know" button 1010, or "skip for now" button 1012, step 3104. Then, based on the selected response, a risk ID number is determined, step 3106. The risk ID number for each response to a specific question was previously assigned by the administrator and is stored in the questions database 3706. Next, the risk ID for the selected response is stored in the project database 3710, step 3108. Then, any executable commands associated with the risk ID number, such as sending an email, are executed, step 3110. For example, consider the question, "Has the civil engineer provided positive grades on each of the building lots?" First, the question ID is stored in the project database 3710, the question is presented to the user, and the user selects a response. Yes button 1006 does not generate a risk as the selection of yes button 1006 indicates that positive grades have been provided and therefore, no further action is necessary. The risk ID number "0" associated with a "yes" selection is stored in the project database 3710. Risk ID number "0" means no risk will be displayed in the risks folder 910. No button 1008 is associated with risk ID number "104." Risk ID number "104" generates the text "Contact your land developer about positive grades on each of the building lots." This risk is displayed in the risks folder 910 and can be viewed by the user at anytime.

Don't know button 1010 generates guidance on how the user should proceed with respect to the subject matter of the particular question. For example, for the question, "Has the civil engineer provided positive grades on each of the building lots?", don't know button 1010 is associated with risk ID number "105." Risk ID number "105" generates the text "To determine grade requirements for this site, the provider recommends 2% grade eight feet from the perimeter of a structure." to inform the user on how to begin to obtain positive grades. This risk is displayed in the risks folder 910 and can be viewed by the user at any time. The text for the don't know button is stored in risk database 3708. Skip for now button 1012 is associated with risk ID number "0" and allows the client to skip the question and does not generate a risk. The questions contained in site development folder 914, environmental folder 916, geotechnical folder 918, and structural folder 920 are all presented to the client in the same manner as described above.

Table 1 shows a list of questions of the preferred embodiment to be presented to the user along with the risk ID number assigned to a yes, no, skip, or don't know response to each question.

TABLE 1

| ID | Area | Question | YES | NO | SKIP | DNK |
|---|---|---|---|---|---|---|
| 37 | C | Have you participated in an early development, pre-construction meeting to evaluate potential civil site challenges? | 0 | 102 | 0 | 103 |
| 19 | C | Has the civil engineer provided positive grades on each of the building lots? | 0 | 104 | 0 | 105 |
| 20 | C | Has sufficient pad design been done to avoid excessive cut and fill beneath the building pads? | 0 | 104 | 0 | 107 |
| 21 | C | Has the erosion control been addressed in the civil engineering report? | 0 | 108 | 0 | 109 |
| 22 | C | Has retaining structures been identified for this site? | 110 | 0 | 0 | 111 |
| 23 | C | Has civil engineer provided control of surface and subsurface water migration, if the potential exists? | 0 | 112 | 0 | 113 |
| 24 | C | Have the final grades and drainage been validated as specified in the civil engineering design document? | | 114 | 0 | 115 |
| 29 | D | Does the tree canopy extend over building site pad? | 122 | 0 | 0 | 123 |
| 30 | D | Have there been prior roads, fences, and trails that existed at this site? | 124 | 0 | 0 | 125 |
| 31 | D | Does this site have expansive soils? | 127 | 0 | 0 | 128 |
| 38 | D | Does this site have excessive elevation changes? | 138 | 0 | 0 | 139 |
| 32 | D | Have there been cuts or fills on pads that exceed five feet? | 129 | 0 | 0 | 130 |
| 33 | D | Are there proper positive drainage grades away from the homes? | 0 | 131 | 0 | 132 |
| 34 | D | Are there variable soil types at this site? | 133 | 0 | 0 | 134 |
| 35 | D | Is there known surface or subsurface water present at this site? | 135 | 0 | 0 | 136 |
| 36 | D | Have the homeowners been informed about the importance of proper maintenance? | 0 | 137 | 0 | 137 |
| 7 | E | Have you participated in an early development, pre-construction meeting to evaluate potential environmental site challenges? | 0 | 85 | 0 | 86 |
| 8 | E | Have aerial photographs and other applicable maps been reviewed to access present and prior land usage? | 0 | 87 | 0 | 87 |
| 10 | E | Have there been any environmental issues that need to be communicated at this site? | 88 | 0 | 0 | 89 |
| 11 | G | Have you participated in an early development, pre-construction meeting to evaluate potential geotechnical site challenges? | 0 | 90 | 0 | 91 |
| 12 | G | Has a geotechnical report that included all available sub surface information been provided to you? | 0 | 92 | 0 | 92 |
| 13 | G | Has there been a sufficient number of spatial densities of soil borings to characterize the soils at the site? | 0 | 93 | 0 | 94 |
| 14 | G | Were the grading operations complete prior to the geotechnical investigation? | 0 | 95 | 0 | 95 |
| 15 | G | Has the placement of fill been tested for density and moisture content? | 0 | 96 | 0 | 97 |
| 16 | G | Has any known or expected unfavorable site and sub surface conditions been identified at this site? | 0 | 98 | 0 | 98 |
| 9 | G | Has the geotechnical report provided recommendations for foundation systems, and have associated risks been defined for each? | 0 | 99 | 0 | 100 |
| 17 | G | Has the geotechnical report provided suitable design parameters for the foundation system? | 0 | 101 | 0 | 100 |
| 18 | G | Have soil treatment options been identified and recommended in the geotechnical report? | 0 | 101 | 0 | 100 |
| 25 | S | Have you participated in an early development, pre-construction meeting to evaluate potential structural site challenges? | 0 | 116 | 0 | 117 |
| 26 | S | Have you received structural plan from the structural engineer? | 0 | 118 | 0 | 119 |
| 27 | S | Have you had a pre-pour verification of conformance of the as-built conditions with the foundation design? | 0 | 120 | 0 | 120 |
| 28 | S | Have you had a post-pour verification of conformance of the as-built conditions with the foundation design? | 0 | 121 | 0 | 121 |

The ID column in Table 1 displays the ID number of the question. The area column displays the area or discipline the question corresponds to. For example, C=Civil, D=Site Development, E=Environmental, G=Geotechnical, and S=Structural. The question column contains the text of the question that is presented to the user. The yes, no, skip, and dnk columns displays the risk ID numbers assigned to each response for each question.

Table 2 shows a list of risks of the preferred embodiment to potentially be presented to the user under the risk tab in reaction to the user's response to each question.

TABLE 2

| ID | Area | Risk |
|---|---|---|
| 200 | | |
| 102 | C | Setup up a meeting with all interested parties on civil engineering site challenges. |
| 103 | C | Meeting needed to reduce information gaps, communicate process, and reduce risk. |
| 104 | C | Contact your land developer about positive grades on each of the building lots. |
| 105 | C | Determine grade requirements for this site, BCI recommend 2% grade eight feet from the perimeter of a structure. |
| 106 | C | Contact land developer regarding higher risk involved with excessive cut and fill. |
| 107 | C | Review cut and fill information. |
| 108 | C | Contact civil engineer for an erosion control recommendation. |
| 109 | C | Review civil engineer report for erosion control recommendations. |
| 110 | C | Review detail design of structural engineer. |
| 111 | C | Review civil engineer design plans for retaining structure. |
| 112 | C | Contact Bryant Consultants Inc. on a plan of action on surface and subsurface water migration. |
| 113 | C | Review risks associated with perched ground water. |
| 114 | C | Contact civil engineer to validate the final grades and drainage. |
| 115 | C | Contact the land developer to see if the final grades and drainage has been validated. |
| 122 | D | Review remediation techniques for trees. |
| 123 | D | Determine if the canopy of the trees at this site extend over building site pads. |
| 124 | D | Consider possible soil treatments for the affected areas of historical usage. |
| 125 | D | Contact Earth Systems Technologies to discuss course of action on historical land usage study. |
| 127 | D | Consider soil treatment method(s) to help reduce the soil movement potential and the corresponding reduction in predicted movement. |
| 128 | D | Review geotechnical report concerning soil types. |
| 129 | D | Review compaction, treatments, and possible deep foundation requirements. |
| 130 | D | Contact Earth Systems Technologies to discuss course of action on grade analysis study. |
| 131 | D | Contact civil engineer on the correction of grades around the home. |
| 132 | D | Determine proposed grades around the homes at this site. |
| 133 | D | Contact geotechnical and site development engineers to identify variable soil risks. |
| 134 | D | Contact Earth Systems Technologies to discuss course of action on variable soil analysis study. |
| 135 | D | Contact geotechnical engineer to identify the lot(s) where known perched water conditions may exist. |
| 136 | D | Contact Earth Systems Technologies to discuss course of action on identifying perched water conditions. |
| 137 | D | Develop a process for individual homeowners to review the maintenance requirement of their new home. |
| 138 | D | Consider the usage of designed retaining structures. Contact the civil, geotechnical and structural engineers. |
| 139 | D | Excessive elevation changes may result in excessive cuts and fills, slope failures, and thus, should be strongly considered in the overall type of foundation system. |
| 85 | E | Setup up a meeting with all interested parties on environmental site challenges. |
| 86 | E | Meeting needed to reduce information gaps, communicate process, and reduce risk. |
| 87 | E | Contact Earth Systems Technologies to discuss course of action on historical land usage study. |
| 88 | E | Inform all interested parties about environmental issues related to this site. |
| 89 | E | Contact Land Developer to ask for environmental impact study. |
| 90 | G | Setup up a meeting with all interested parties on geotechnical site challenges. |
| 91 | G | Meeting needed to reduce information gaps, communicate process, and reduce risk. |
| 92 | G | Contact your land developer about getting a copy of the geotechnical report |
| 93 | G | Additional geotechnical and or geophysical data is needed at the site. Contact the geotechnical engineer. |
| 94 | G | Refer to recommended guidelines and industry standards for spatial boring density for subdivisions and individual lots. |
| 95 | G | Contact geotechnical engineer to see if finished pad elevations alter the original geotechnical recommendations. |
| 96 | G | Contact your land developer, geotechnical, and structural engineers about testing fill materials. |
| 97 | G | Improperly compacted fill can result in excessive settlement which can cause differential foundation movement primarily in slab on grade foundations. Fill soils placed in a dry stated can result in excessive upward differential movements. |
| 98 | G | Contact Earth Systems Technologies for a plan of action to identify unfavorable site and sub surface conditions. |
| 99 | G | Contact geotechnical engineer for recommended foundation systems. |
| 100 | G | Review Pros and Cons of foundation design. |
| 101 | G | Contact the geotechnical engineer for design parameters. |
| 116 | S | Setup up a meeting with all interested parties on structural site challenges. |
| 117 | S | Meeting needed to reduce information gaps, communicate process, and reduce risk. |
| 118 | S | Contact the structural engineer for a copy of their plan. |
| 119 | S | Contact the land developer regarding structural engineer plan. |
| 120 | S | Contact structural engineer to arrange an appointment to inspect as-built prior to pour. |
| 121 | S | Contact structural engineer to arrange an appointment to inspect as-built after the pour. |

The ID column displays the ID number of the question. The area column displays the area or discipline the question corresponds to. For example, C=Civil, D=Site Development, E=Environmental, G=Geotechnical, and S=Structural.

Provider Administrator

Figure 12:
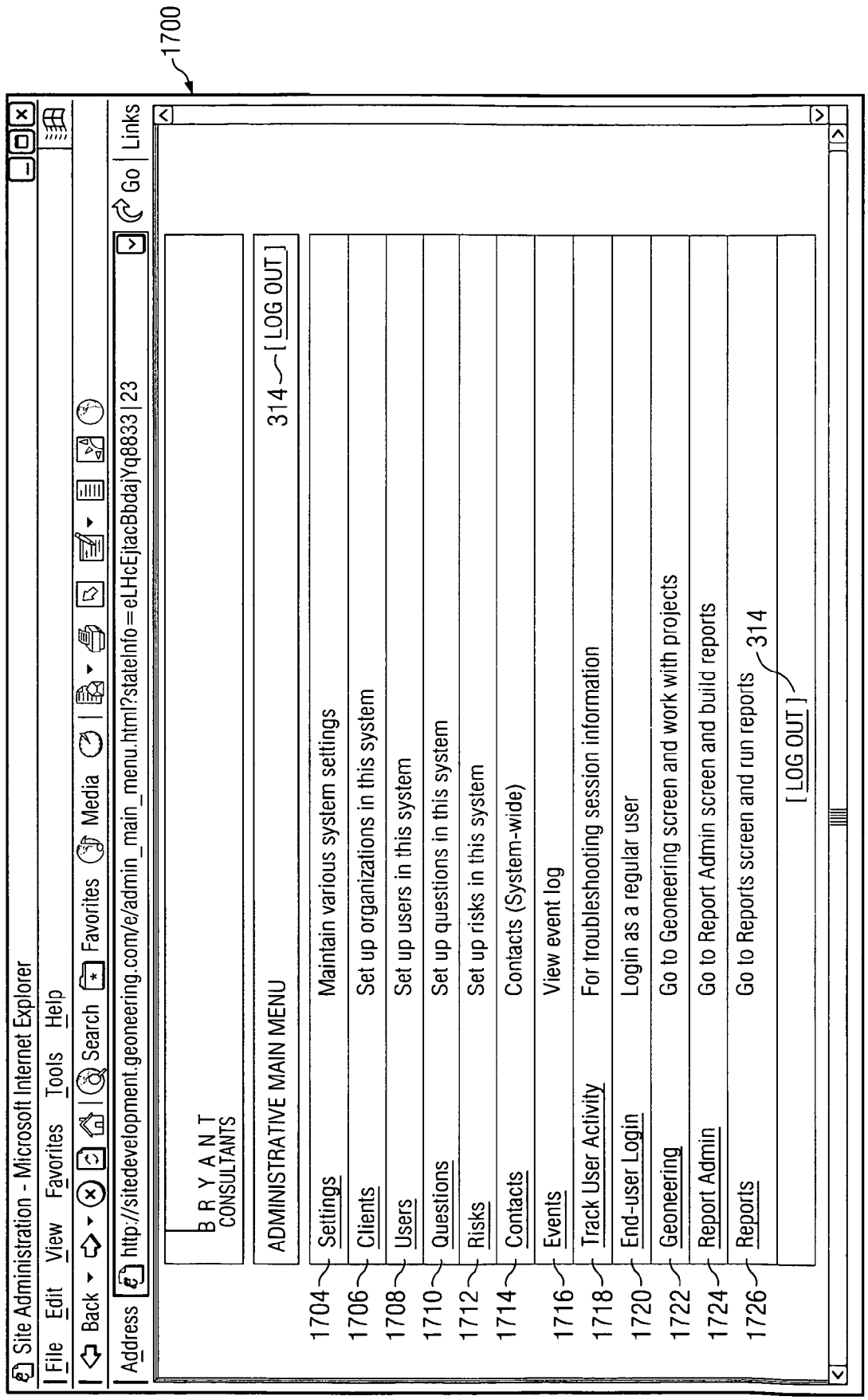
FIG. 12 is a screen shot of the administrative main menu screen according to the present invention.

If the login ID used to log into the system 3601 is associated with an administrator of the system 3601, then administrative main menu screen 1700, FIG. 12, is displayed instead of the project selection screen 300. Administrative main menu screen 1700 includes the following: settings tab 1704 which accesses the settings screen 1800 and allows the administrator to create and modify system settings, clients tab 1706 which accesses the client screen 2000 and allows the administrator to create and modify clients of the provider who use the system 3601, users tab 1708 which accesses the user screen 2200 and allows the administrator to create and modify users in the system 3601, questions tab 1710 which accesses the question screen 2400 and allows the administrator to create and modify questions relating to each discipline, risks tab 1712 which accesses the risk screen 2600 and allows the administrator to create and modify the risks that are displayed based on the answers given in response to the questions, contacts tab 1714 which accesses the contact screen 2800 and allows the administrator to create and modify the system wide contacts, events tab 1716 which accesses the system events screen 3000 and allows the administrator to view an events log for each user, track user activity tab 1718 which accesses the session and hit tracking screen 3100 and tracks a users activity for troubleshooting session information, end-user login tab 1720 which accesses the login screen 200 and allows the administrator to login as a user, geoneering tab 1722 which accesses the geoneering screen 900 and allows the administrator to work with a selected project, report admin tab 1724 which accesses the report administration screen 3628 and allows the administrator to build reports, and reports tab 1726 which accesses the reports screen 3630 and allows the administrator to view reports. The administrative main menu screen 1700 also contains log out tab 314 which allows the administrator to logout of the system 3601.

Figure 13:
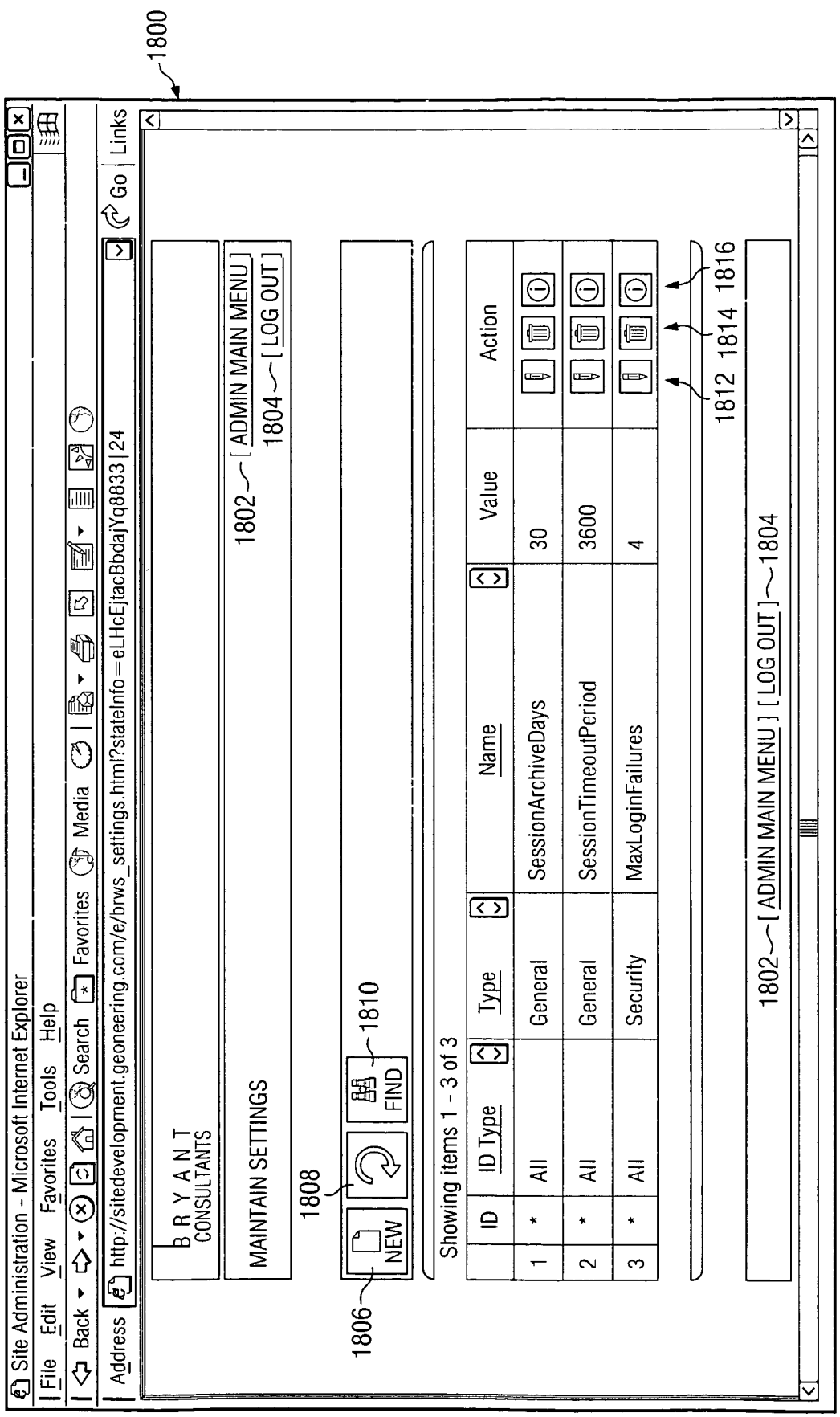
FIG. 13 is a screen shot of the settings screen according the present invention.

If settings tab 1704 is selected, then the settings screen 1800, FIG. 13, is displayed. Settings screen 1800 contains an admin main menu tab 1802 and log out tab 314. Admin main menu tab 1802 accesses the administrative main menu screen 1700. Settings screen 1800 displays all the system settings located in the setting database 3720. In the preferred embodiment, the settings include how many days a user's session is open before it is archived, how long the system 3601 waits during a no activity period before a time out period is automatically initiated, and the number of login attempts a user is allowed before the system 3601 locks the user out. Settings are guidelines, protocols, or rules governing the user's interaction with the system 3601.

New setting icon 1806 allows the administrator to add a new system setting to the setting database 3720. New setting icon 1806 accesses the add a setting screen 3610, to be described later. Refresh setting icon 1808 allows the administrator to query the setting database 3720 for all settings and refreshes the listing of all the settings. Find icon 1810 allows the administrator to search for a specific setting in the setting database 3720.

Proximate to each listed setting is edit setting icon 1812, delete setting icon 1814, and setting information icon 1816. Delete setting icon 1814 allows the administrator to delete the specific setting associated with the selected delete setting icon 1814. Setting information icon 1816 gives specific information about the listed setting. Setting information icon 1816 accesses the settings database 3720 for a description of the setting and displays the description to the administrator. Edit setting icon 1812 allows the administrator to edit the specific setting associated with the edit icon 1812. Edit setting icon 1812 accesses the edit a setting screen 1900.

Figure 14:
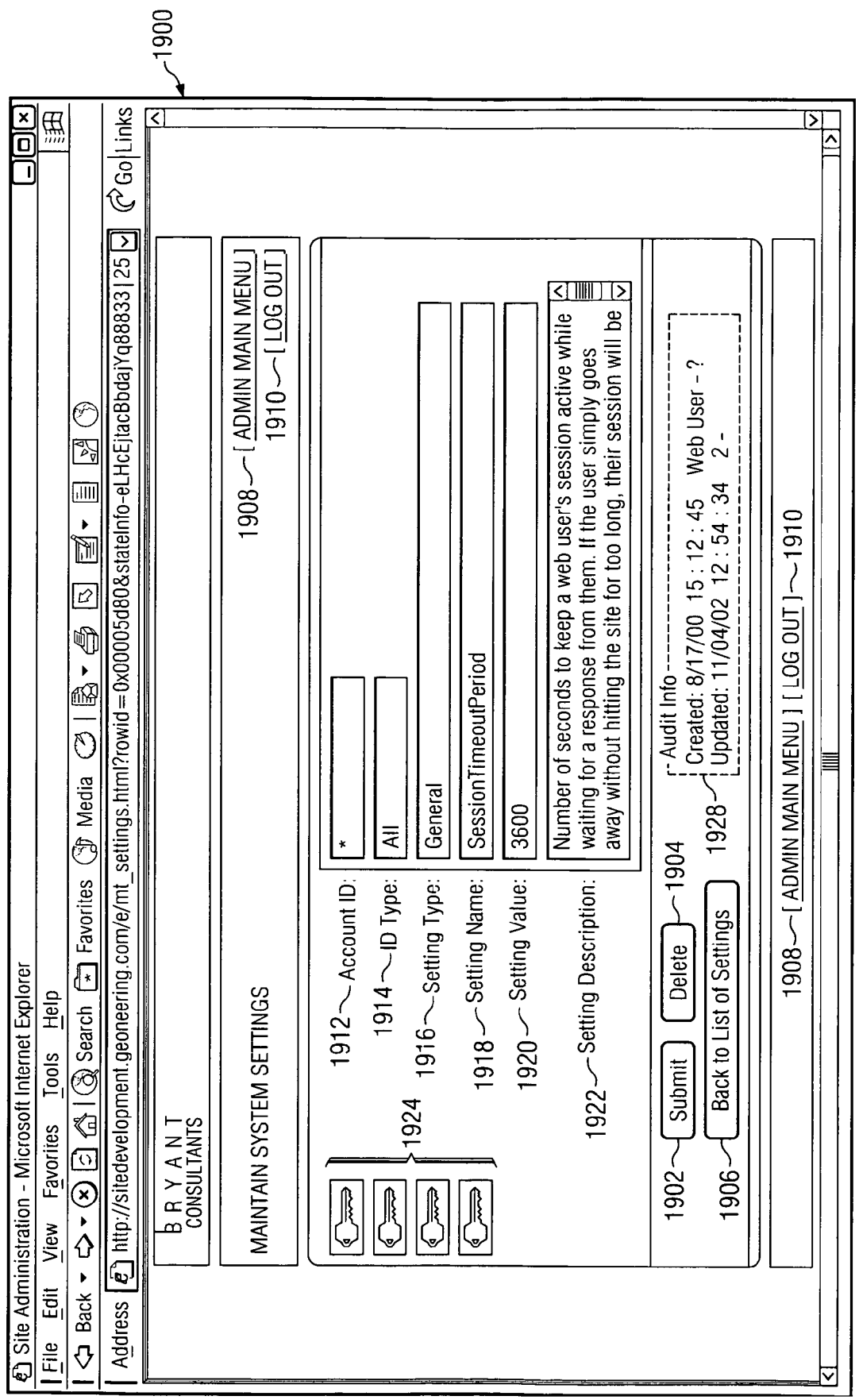
FIG. 14 is a screen shot of the edit a setting screen according to the present invention.

Upon selection of the edit setting icon 1812, the database manager 3700 searches the setting database 3720 for the setting corresponding to the selected edit setting icon 1812. The information in the setting database 3720 relating to the corresponding setting is displayed on edit a setting screen 1900, shown in FIG. 14.

Edit a setting screen 1900 contains account ID box 1912 which displays what users the setting applies to, ID type box 1914 which displays what group of users the setting applies to, setting type box 1916 which displays the setting type, setting name box 1918 which displays the setting name, setting value box 1920 which displays the value of a variable related to the setting, and setting description box 1922 which displays the description of the setting.

Account ID box 1912 allows the administrator to apply the setting to a specific user. An asterisk means the setting applies to all users. A number in account ID box 912 indicates the setting applies only to the user ID displayed in account ID box 912.

ID type box 1914 allows the provider to apply the setting to a group of users. The group is defined using the WebSpeed® software. For example, if the setting was to apply to the users of a specific client, the group of users is defined using the WebSpeed® software. Such creation of groups using WebSpeed® is known in the art. Then the group name used to the created group is entered into the ID type box 1914 and the displayed setting would apply only to that group. The word "all" in ID type box 1914 indicates the setting applies to all users.

Setting type box 1916 allows the administrator to set the type of setting. The two setting types allowed by WebSpeed® are general and security. Setting description box 1922 allows the administrator to give a description of the setting. It is this description that is displayed to the administrator when the setting information icon 1816 is selected.

Locked icon 1924 indicates account ID box 1912, ID type box 1914, setting type box 1916, and setting name box 1918 can only be accessed by a super administrator. A super administrator can modify any setting or field within the system 3601.

Edit a setting screen 1900 also contains submit setting icon 1902 for saving the displayed system setting to the setting database 3720, delete setting icon 1904 for deleting the displayed system setting from the setting database 3720, and back to list of settings icon 1906 which accesses the settings screen 1800.

Audit information box 1928 displays the earliest and latest date the displayed setting was modified corresponding to event web user and user ID. To obtain the earliest and latest date, the database manager 3700 queries the events database 3722 for all events related to the displayed setting. Then, using the WebSpeed® software, the system 3601 sorts the dates of the events relating to the displayed setting and displays the earliest and latest date the setting was modified. Also displayed on edit a setting screen 1900 is admin main menu tab 1802 and log out tab 314.

The add a setting screen 3610 is similar to edit a setting screen 1900 except in the add a setting screen account ID box 1912, ID type box 1914, setting type box 1916, setting name box 1918, setting value box 1920, and setting description box 1922 are blank. After the desired information is entered into each box and upon selection of submit setting icon 1902, the information displayed in each box is saved in the setting database 3720 resulting in a new setting being added to the setting database 3720.

Figure 15:
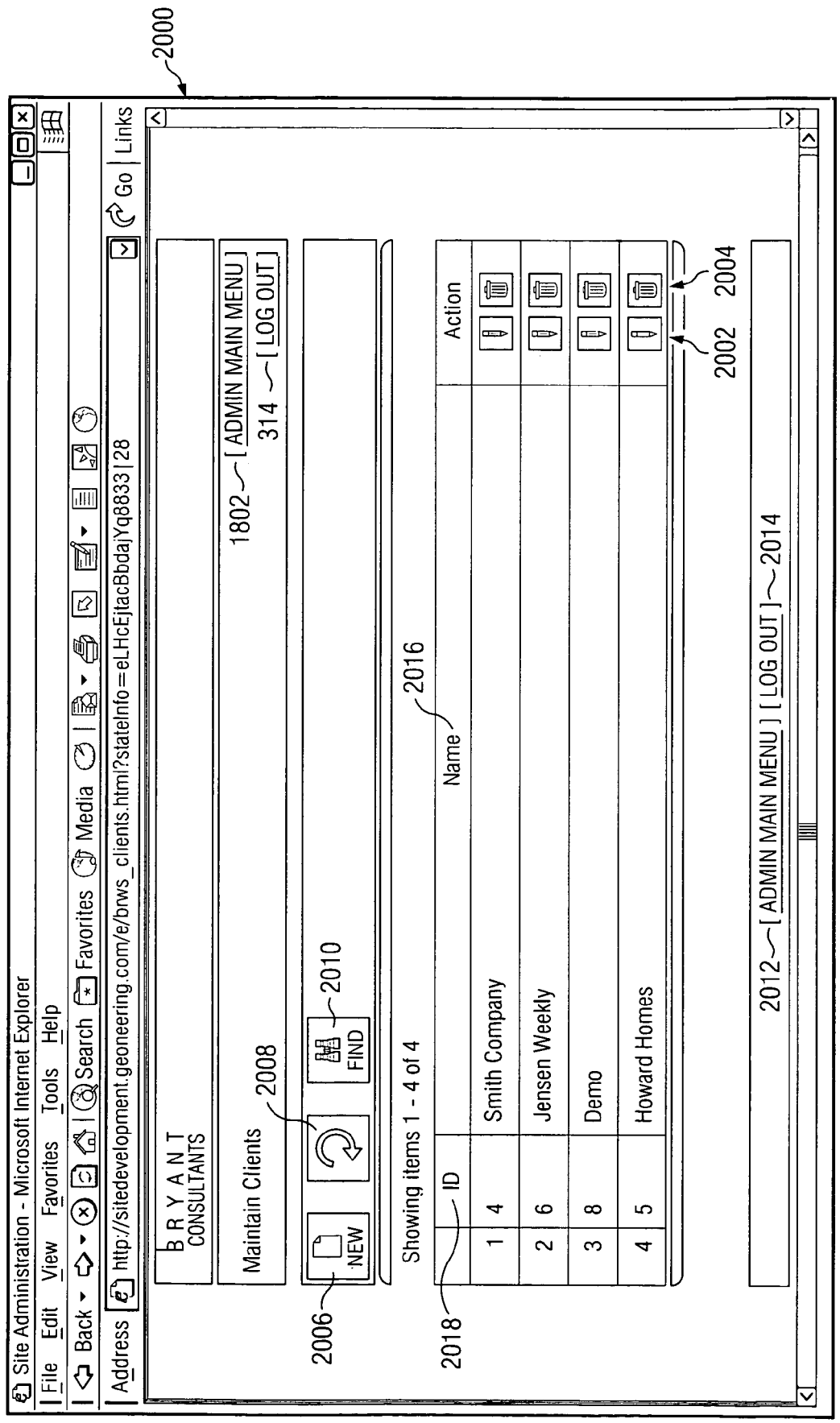
FIG. 15 is a screen shot of the maintain client screen according to the present invention.

Client screen 2000, FIG. 15, displays a list of all the clients in the client database 3716. Contained in client screen 2000 is new client icon 2006 for adding new clients to the client database 3716, client refresh icon 2008 for refreshing the list of clients, and client find icon 2010 for finding a specific client in the client database 3716. New client icon 2006 accesses the add a client screen 3612 to be described later. Client refresh icon 2008 queries the client database 3716 for all clients and refreshes the listing of all the clients. Find a client icon 2010 allows the administrator to search for a specific client in the client database 3716.

Client screen 2000 also contains administrative main menu tab 1802 and log out tab 314, client name column 2016 which displays the name of the client, client ID column 2018 which displays the client ID, edit client icon 2002, and delete client icon 2004. Delete client icon 2004 allows the administrator to delete a client from the client database 3716. Edit client icon 2002 allows the administrator to edit the client information stored in the client database 3716. Edit client icon 2002 accesses the edit a client screen 2100.

Figure 16:
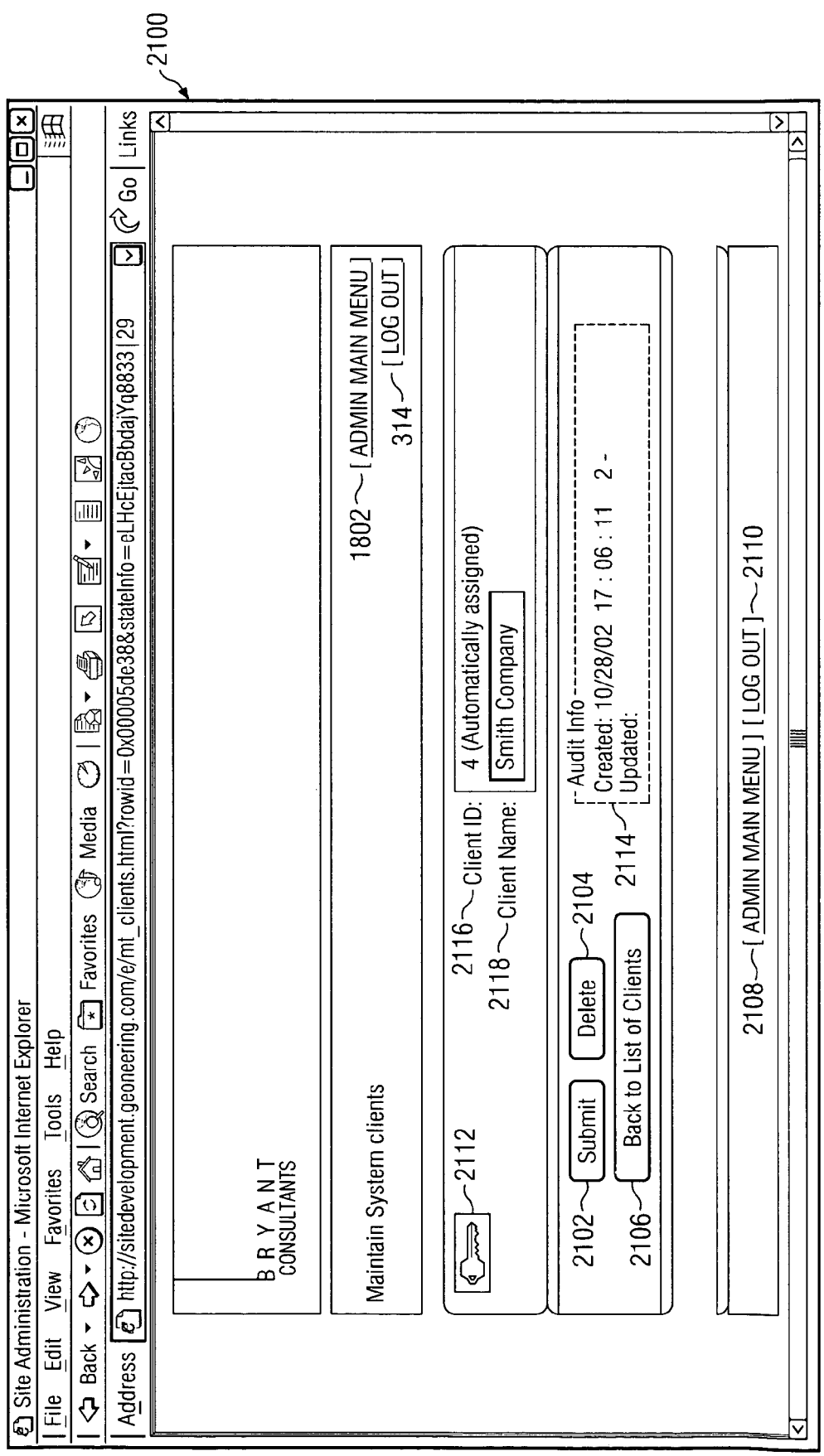
FIG. 16 is a screen shot of the edit client screen according to the present invention.

Upon selection of the edit client icon 2002, the database manager 3700 searches the client database 3716 for the client corresponding to the selected edit client icon 2002. The information in the client database 3716 relating to the corresponding client is displayed on edit a client screen 2100 shown in FIG. 16.

Edit a client screen 2100 contains client ID box 2116, which displays the client ID. The client ID and is automatically assigned by the system 3601 to the client by making the client ID the first record position in the client database 3716 that is open. When the system 3601 assigns a client ID number, the client database 3716 is accessed and starting with the first record, each record is read until an empty record is discovered. When an empty record is discovered, the client ID number is assigned the number that corresponds to the empty record and the client information is stored in the empty record. Locked icon 2112 indicates the client ID number can only be accessed by a super administrator. Edit a client screen 2100 also contains client name box 2118 which displays the client's name.

Audit information box 2114 displays the earliest and latest date that the displayed client was modified. To obtain the earliest and latest date, the database manager 3700 queries the events database 3722 for all events related to the displayed client. Then, using the WebSpeed® software, the system 3601 sorts the dates of the events relating to the displayed client and displays the earliest and latest date the client was modified.

Also displayed on edit a client screen 2100 is submit client icon 2102 which saves the displayed client's information to the client database 3716, client delete icon 2104 which deletes the client from the client database 3716, and back to list of clients icon 2106 for returning to the client screen 2000. Also displayed is admin main menu tab 1802 and log out tab 314.

The add a client screen 3612 is similar to edit a client screen 2100 except in the add a client screen 3612, the client ID box 2116 and client name box 2118 are blank. After the desired information is entered into each box and upon selection of the submit client icon 2102, the information displayed in each box is saved in the client database 3716 resulting in a new client being added to the client database 3716.

Figure 17:
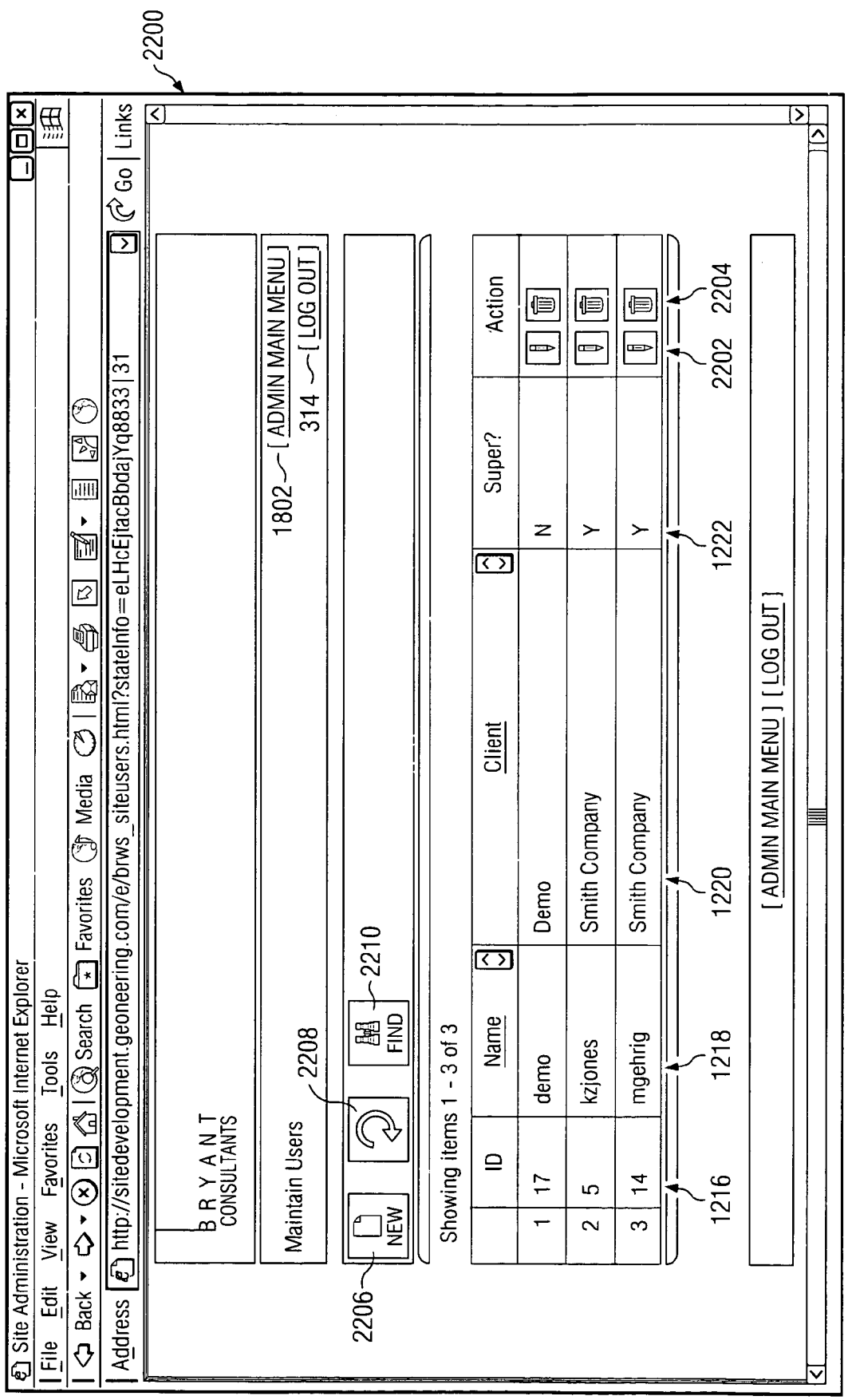
FIG. 17 is a screen shot of the maintain user screen according to the present invention.

User screen 2200, FIG. 17, displays a list of all the users in the user database 3718. Displayed on user screen 2200 is new users icon 2206 for adding a new user to the user database 3718, refresh user icon 2208 to query the user database 3718 for all users and refresh the list of displayed users, and find icon 2210 for finding a specific user in the user database 3718. New users icon 2206 allows the administrator to add a new user to the user database 3718. New user icon 2206 accesses the add a user screen 3614, to be described later. Also displayed is admin main menu tab 1802 and log out tab 314.

User screen 2200 also displays user ID column 1216 for displaying the user's ID number, user name column 1218 for displaying the user's name, client column 1220 which displays the client the user is associated with, access column 1222 which indicates whether the corresponding ID number and name has super administrator access, edit user icon 2202, and delete user icon 2204. The provider is listed in the client database 3716 as a client. A client can have more than one user registered with the system 3601. For example, FIG. 17 shows two users assigned to the client Bryant Consultants, Inc. A super administrator is identified by a "Y" in access column 1222. The "Y" indicates full access to the entire system 3601. A "N" in access column 1222 indicates a user which has only limited access to the system 3601. The amount of access a user has is determined by the administrator and set using the WebSpeed® software.

Delete user icon 2204 allows the administrator to delete from the user database 3718 the user that corresponds to the selected delete user icon 2204. Edit user icon 2202 accesses the edit a user screen 2300 and allows the administrator to edit the user information corresponding to the selected edit user icon 2202. Upon selection of the select user icon 2202, the database manager 3700 searches the user database 3718 for the user corresponding to the selected edit user icon 2202. The information in the user database 3718 relating to the corresponding user is displayed on edit a user screen 2300, FIG. 18.

Edit a user screen 2300 contains user ID box 2314 which displays the user's ID number, user name box 2316 which displays the user's name, password box 2318 which displays the user's password, start date box 2320 which displays the date the user had initial access to the system 3601, end date box 2322 which displays the last date the user will have access to the system 3601, admin user check box 2324 which indicates whether the user has limited access to the system 3601 or is a super administrator with full access to the system 3601, client drop down box 2326 which displays what client the user is associated with, failure count box 2328 which counts the number of times the user has attempted to login to the system 3601 and has failed to complete a valid login, and phone number box 2330 which displays the user's phone number.

The user ID number is automatically selected by the system 3601 based on the first blank record position in the user database 3718. As shown by locked icon 2332, user ID box 2314 can only be changed by a super administrator. Client drop down box 2326 accesses the client database 3716 to provide a list of clients the user can be associated with. The provider's information is listed in the client database so a user can be associated with the provider.

Audit information box 2312 displays the earliest and latest date the user was modified. To obtain the earliest and latest date, the database manager 3700 queries the events database 3722 for all events related to the displayed user, using the WebSpeed® software, the system 3601 sorts the dates of the events relating to the displayed user and displays the earliest and latest date the user was modified.

Also displayed on edit a user screen 2300 is submit user icon 2302, user delete icon 2304, and back to list of user icon 2306. Submit user icon 2302 saves the displayed user's information to the user database 3718. User delete icon 2304 deletes the displayed user from the user database 3718. Back to list of user icon 2306 access the user screen 2200. Also displayed on edit a user screen 2300 is admin main menu tab 1802, and log out tab 314.

The add a user screen 2614 is similar to edit a user screen 2300 except in the add a user screen 2614, user name box 2316, password box 2318, start date box 2320, end date box 2322, admin user check box 2324, client drop-down box 2326, carrier count box 2328 and phone number box 2302 are blank. After the desired information is entered into each box and upon selection of the submit user icon 2302, the information displayed in each box is saved in the user database 3718 resulting in a new user being added to the user database 3718.

Question screen 2400, FIG. 19, displays all the questions in the questions database 3706. Question screen 2400 contains new question icon 2406 for adding a new question to the questions database 3706, refresh icon 2408 for querying the questions database 3706 for all questions and then refreshing the list of displayed questions, and find icon 2410 for finding a specific question in the questions database 3706. New question icon 2406 allows the administrator to add a new question to the questions database 3706. New questions icon 2406 accesses add a question screen 3616 to be described later. Question screen 2400 also contains admin main menu tab 1802 and log out tab 314.

In addition, question screen 2400 contains question ID column 2416 which displays the question's ID number, area column 2418 which displays the discipline area in which the question will appear, sort column 2420 which displays the position the question will appear when all the questions for a specific section are presented to the user, text column 2422 which displays the text of the question, and URL column 2424 which displays whether or not more information will be available to the user if the user selects the more info tab 1004. If, for a specific question, the text "More Info" is not present in URL column 2624 then for that specific question, a URL has not been assigned and more information is not available with respect to that specific question.

To determine whether or not to display the text "More Info" the system 3601, using the database manager 3700 queries the URL link field in the questions database 3706 to determine what questions have a URL link. If a question has a URL link, then the text "More Info" is displayed with the corresponding question information.

Question screen 2400 also contains edit question icons 2402 and delete question icons 2404. Delete question icons 2404 allow the administrator to delete the question that corresponds to the selected delete question icon 2404 from the questions database 3706. Edit question icons 2402 access the edit a question screen 2500.

Figure 20:
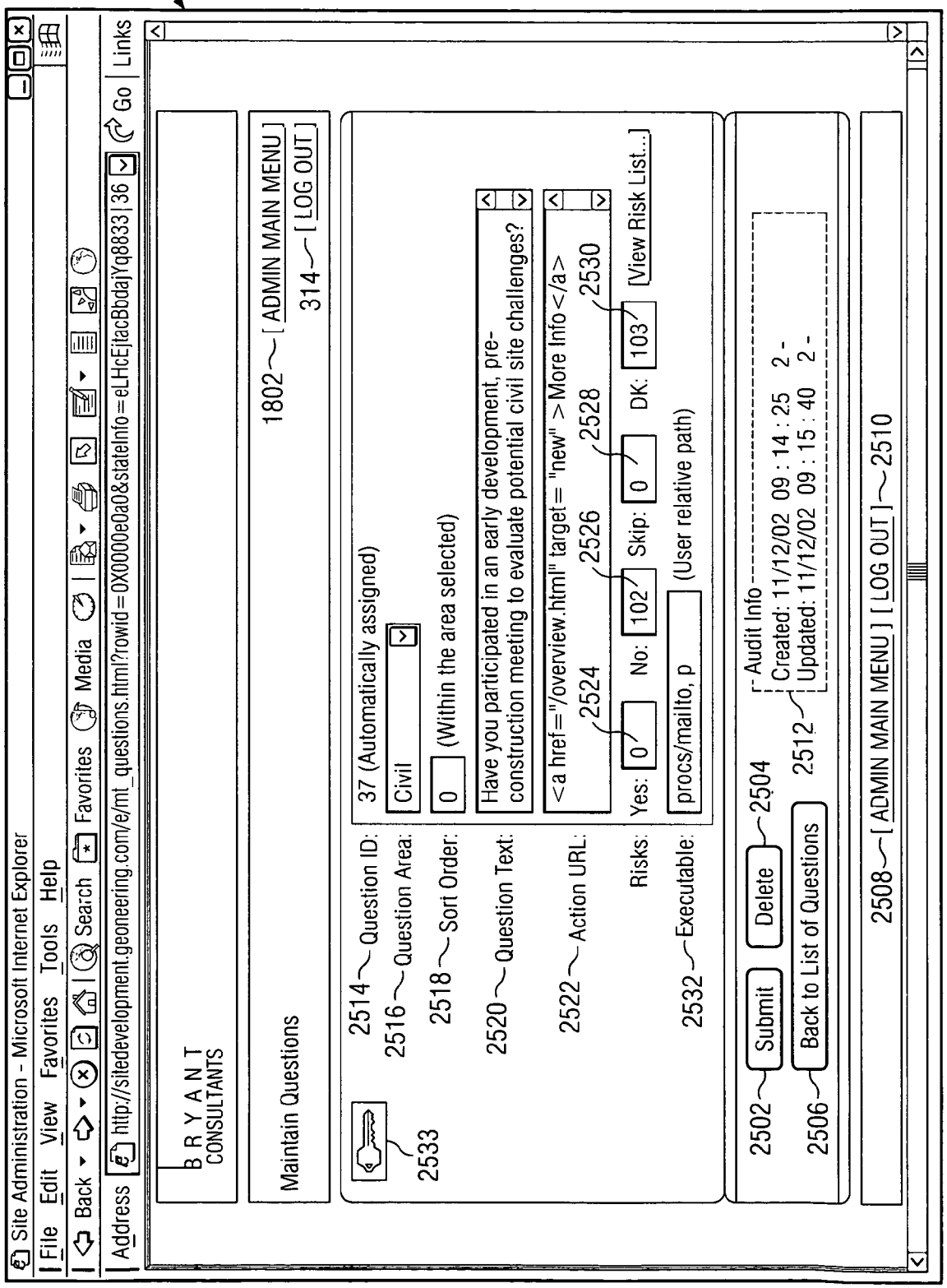
FIG. 20 is a screen shot of the maintain specific question screen according to the present invention.

Upon selection of the edit question icon 2402, the database manager 3700 searches the questions database 3706 for the question corresponding to the selected edit questions icon 2402. The information in the questions database 3706 relating to the corresponding question is displayed on edit a question screen 2500, FIG. 20.

Edit a question screen 2500 contains questions ID box 2514 which displays the question's ID number, question drop down box 2516 which assigns the question to a discipline, sort order box 2518 which indicates where the question will appear when the list of questions for that specific discipline are presented to the user, text box 2520 which contains the text of the question, URL box 2522 which contains the URL that is accessed when the more info tab 1004 is selected, yes box 2524, no box 2526, skip box 2528 and don't know box 2530 which contain a risk ID number identifying what text will be displayed on the screen when the question is answered by the user, and executable box 2532 which contains the path for any executable actions the specific question may initiate such as sending an e-mail. To send an e-mail, various simple mail transfer protocol or email file transfer protocol known in the art are used. Examples include the Simple Mail Transfer Protocol, POP3, or Internet Message Access Protocol. The question's ID number is automatically assigned by the system 3601 based on the first blank record position in the questions database 3706. As shown by locked icon 2533, question ID box 2514 can only be changed by a super administrator.

Audit information box 2512 displays the earliest and latest date that the displayed question was modified. To obtain the earliest and latest date, the database manager 3700 queries the events database 3727 for all the events related to the displayed question. Then, using the WebSpeed® software, the system 3601 sorts the dates of the events relating to the displayed question and displays the earliest and latest date the question was modified.

Also displayed on edit a question screen 2500 is submit question icon 2502 which saves the displayed question's information to the questions database 3706, question delete icon 2504 for deleting the displayed question from the questions database 3706, and back to the list of questions icon 2506 which access question screen 2400. In addition, administrative main menu tab 1802 and log out tab 314 are displayed.

The add a question screen 3616 is similar to edit a question screen 2500 except in the add a question screen 3616, question drop-down box 2516, sort order box 2518, text box 2520, URL box 2522, yes box 2524, no box 2526, skip box 2528, don't know box 2523, and executable box 2532 are blank. After the desired information is entered into each box and upon selection of submit question icon 2502 the information displayed in each box is saved in the questions database 3706 resulting in a new question being added to the questions database 3706.

Figure 21:
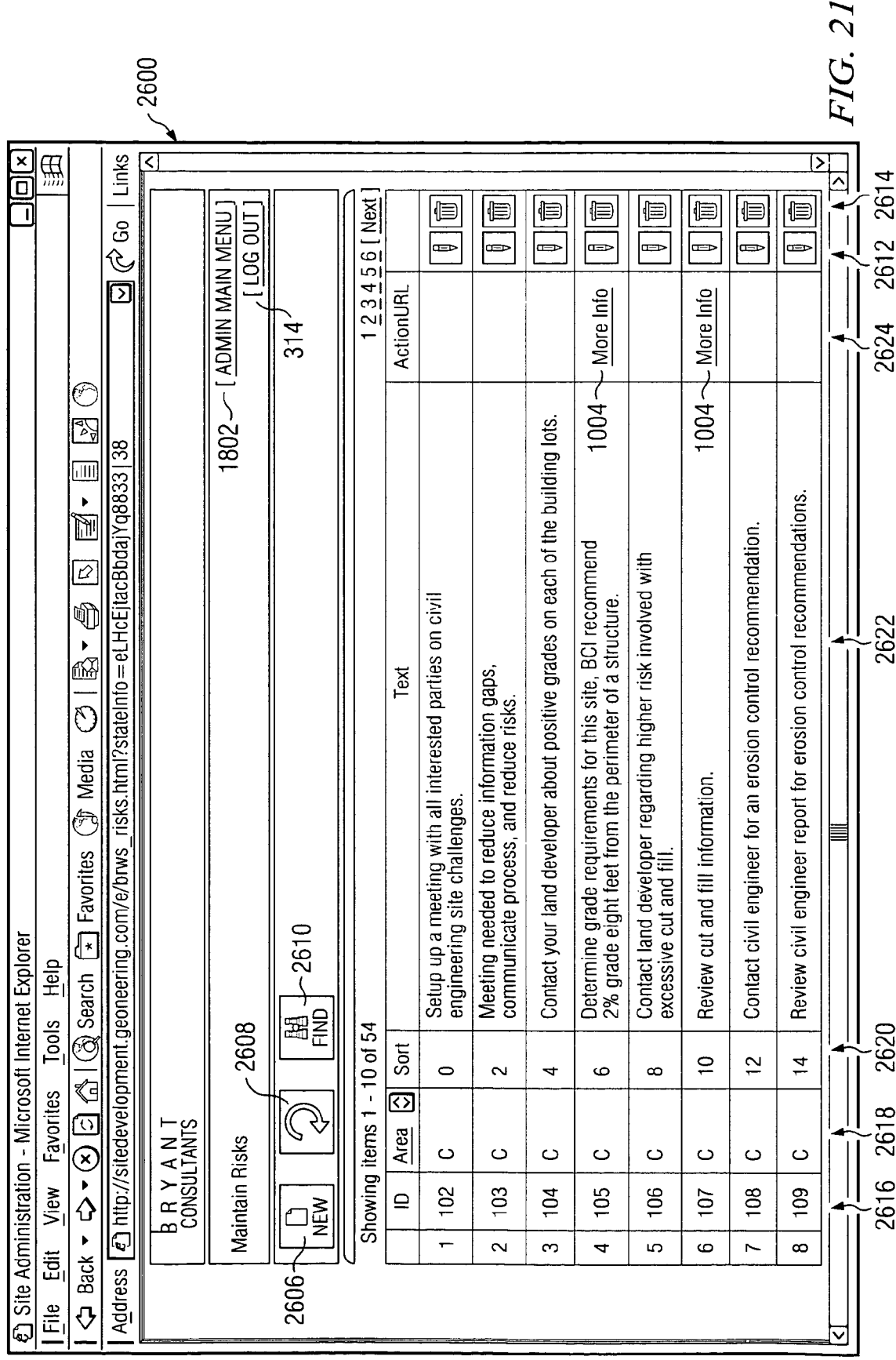
FIG. 21 is a screen shot of the maintain risks screen according to the present invention.

Risk screen 2600, FIG. 21, lists the text associated with each risk ID number. Risk screen 2600 contains administrative main menu tab 1802 and log out tab 314. Risk screen 2600 also contains risk ID column 2616 which displays the risk's ID number, area column 2618 which controls which discipline area the risk is associated with, sort column 2620 which controls the position the risk appears when all the risks are presented to the user, text column 2622 which displays the text of the risk, and URL column 2624 which displays whether or not more information will be available to the user if the user selects the more info tab 1004 associated with a specific risk. To determine whether or not to display the text "More Info", the system 3601, using the database manager 3700 queries the URL link field in the risk database 3708 to determine what risks have a URL link. If a risk has a URL link, then the text "More Info" is displayed with the corresponding risk information. If for a specific risk, in URL column 2624, the text "More info" is not present, then for that specific risk, a URL has not been assigned and more information is not available with respect to that specific risk.

The area of the risk is important because the risks generated by the client's answers to questions are all displayed to the user at one time. By assigning a risk to a specific area, the system can group the risks together by area and the risks can then be displayed to the user in an organized manner. Also, if the risk requires contacting an individual, the individual can be identified as the contact assigned to the discipline the risk is associated with.

Also displayed in maintain risks screen is new risk icon 2606. New risk icon 2606 allows the administrator to add a new risk to the risk database 3708. New risk icon 2606 accesses the add a risk screen 3618, to be described later.

Refresh icon 2608 queries the risk database 3708 for all risks and refresh the list of displayed risks, find icon 2610 allows the administrator to search the risk database 3708 for a specific risk.

Figure 22:
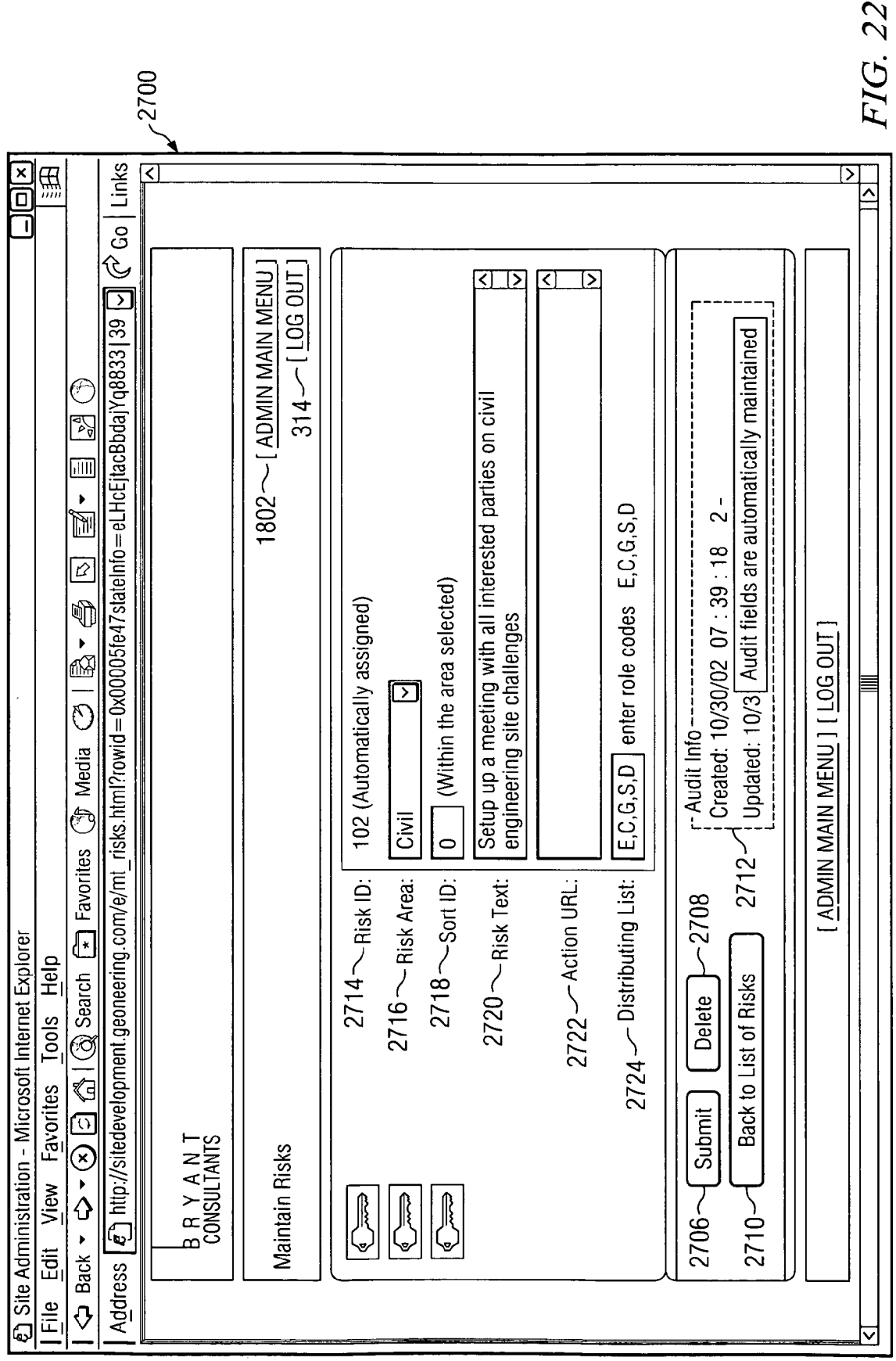
FIG. 22 is a screen shot of the specific risk screen according to the present invention.

Proximate to each listed risk is delete risk icon 2614 and edit risk icon 2612. Delete risk icon 2614 allows the administrator to delete the corresponding risk from the risk database 3708. Edit risk icon allows the administrator to edit the risk that corresponds to the selected edit risk icon 2614. Edit risk icon 2614 accesses the edit risk screen 2700. Upon selection of the edit risk icon 2614, the database manager 3700 searches the risk database 3708 for the risk corresponding to the selected edit risk icon 2614. The information in the risk database 2708 relating to the corresponding risk is displayed on edit risk screen 2700, FIG. 22.

Edit risk screen 2700 contains risk ID box 2714 which displays the risk's ID number, risk area drop down box 2716 which assigns the risk to a discipline, sort order box 2718 which indicates where the risk will appear when the list of risks for that specific discipline are presented to the user, text box 2720 which contains the text of the risk, URL box 2722 which contains the URL that is accessed when the more info tab 1004 is selected, and distribution list box 2724 which indicates what role or discipline areas are affected or need to be notified about the risk. For example, if the code for the civil and environmental discipline areas are displayed in distribution list box 2724, then when the risk is displayed in the risk folder 910, the system 3601 will provide a means for contacting the contacts associated with the civil and environmental disciplines. In the preferred embodiment, "E" is the code for the environmental discipline, "C" is the code for the civil discipline, "G" is the code for the geotechnical discipline, "S" is the code for the structural discipline, and "D" is the code for the site development discipline. In the preferred embodiment, the means of contact includes email. In another embodiment, the means of contact may be by telephone, wherein the phone number of the contact is displayed.

The risk's ID number is automatically assigned based on the first blank record position in the risk database 3708. As shown by lock icon 2714, risk ID box 2714, risk area drop down box 2716, and sort order box 2718 can only be changed by a super administrator. Distribution list box 2724 lists the specific disciplines that need to be contacted regarding the specific risk. If a contact is assigned for a listed discipline, and the contact has an e-mail address the system 3601 can send the assigned contact an e-mail.

Audit information box 2712 displays the earliest and latest date that the displayed risk was modified. To obtain the earliest and latest dates, the database manager 3700 queries the events database 3722 for all events related to the displayed risk. Then, using the WebSpeed® software, the system 3601 sorts the dates of the events relating to the displayed risk and displays the earliest and latest date the risk was modified.

Edit risk screen 2700 also contains submit risk icon 2706 which saves the displayed risk's information to the risk database 3708, risk delete icon 2708 which deletes the displayed risk from the risk database 3708, and back to the list of risks icon 2710 which access the risk screen 2600. In addition, administrative main menu tab 1802 and log out tab 314 are displayed.

The add a risk screen 3618 is similar to edit risk screen 2700 except in the add a risk screen 3618, risk area drop-down box 2716, sort order box 2718, text box 2720, URL box 2722, and distribution list 2724 are blank. After the desired information is entered into each box and upon selection of the submit risk icon 2706, the information displayed in each box is saved in the risk database 3708 resulting in a new risk being added to the risk database 3708.

Figure 23:
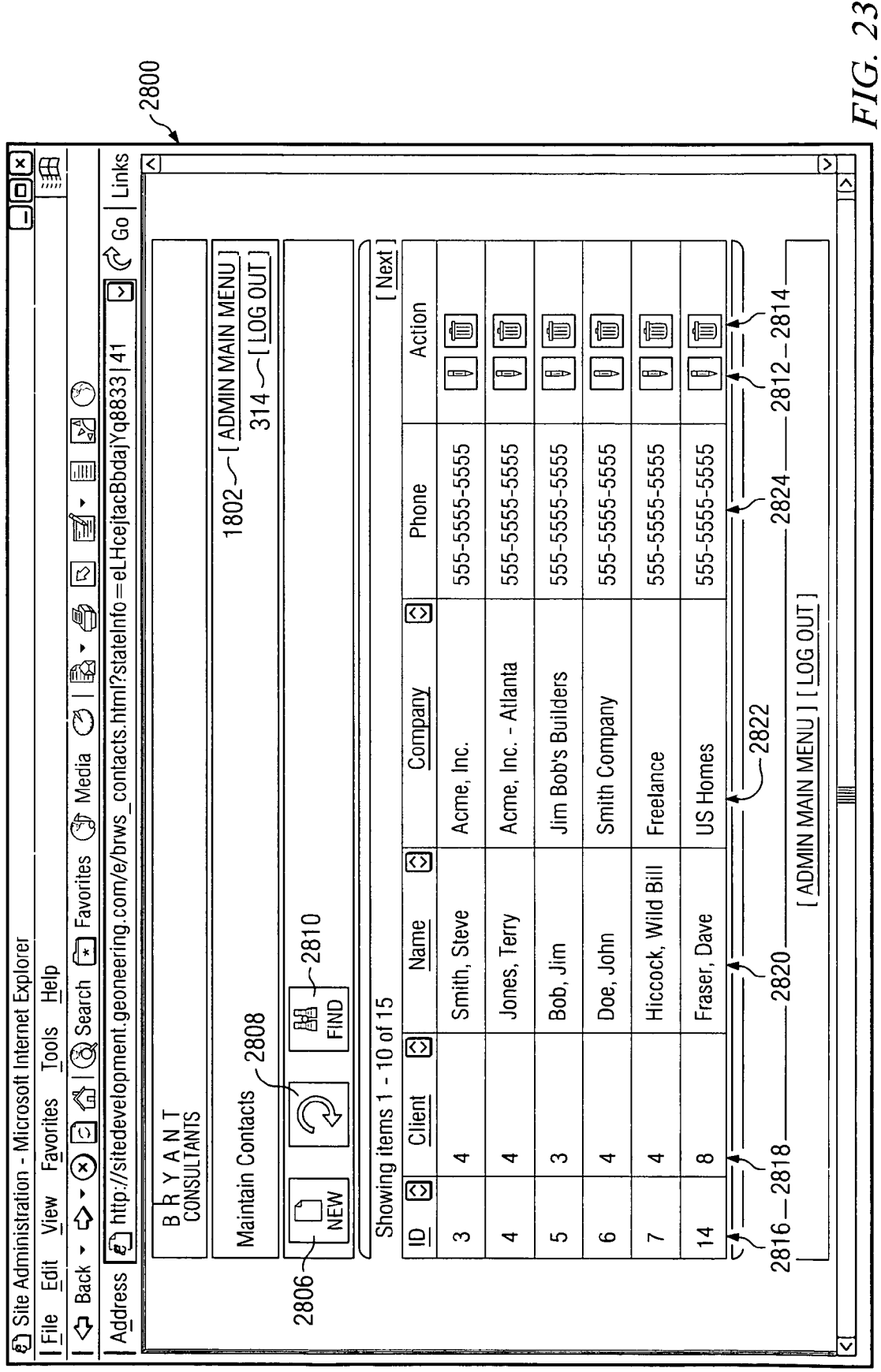
FIG. 23 is a screen shot of the maintain contact screen according to the present invention.

Contact screen 2800, shown in FIG. 23, displays a list of all the contacts in the contact database 3712. Contacts screen 2800 contains admin main menu tab 1802, log out tab 314, new contact icon 2806 which adds a new contact to the contact database 3712, refresh contact icon 2808 which queries the contact database 3712 for all contacts and refreshes the list of displayed contacts, and find icon 2810 which finds a specific contact in the contact database 3712. New contact icon 2806 allows the administrator to add a new contact to the contact database 3712. New contact icon 2806 accesses the add a contact screen 3620, to be described later.

Contact screen 2800 also contains contact ID column 2816 which displays the contacts ID number, client number column 2818 which displays the client ID number the contact is assigned, contact's name column 2820 which displays the contact's name, company column 2822 which displays who the contact works for, and phone number column 2824 which displays the contacts phone number.

Proximate to each listed contact is edit contact icon 2812 and delete contact icon 2814. Delete contact icon 2814 allows the administrator to delete the contact that corresponds to the selected delete contact icon 2814 from the contact database 3712. Edit contact icon 2812 allows the administrator to edit the contact that corresponds to the selected edit contact icon 2812. Edit contact icon 2812 accesses the edit a contact screen 2900.

Figure 24:
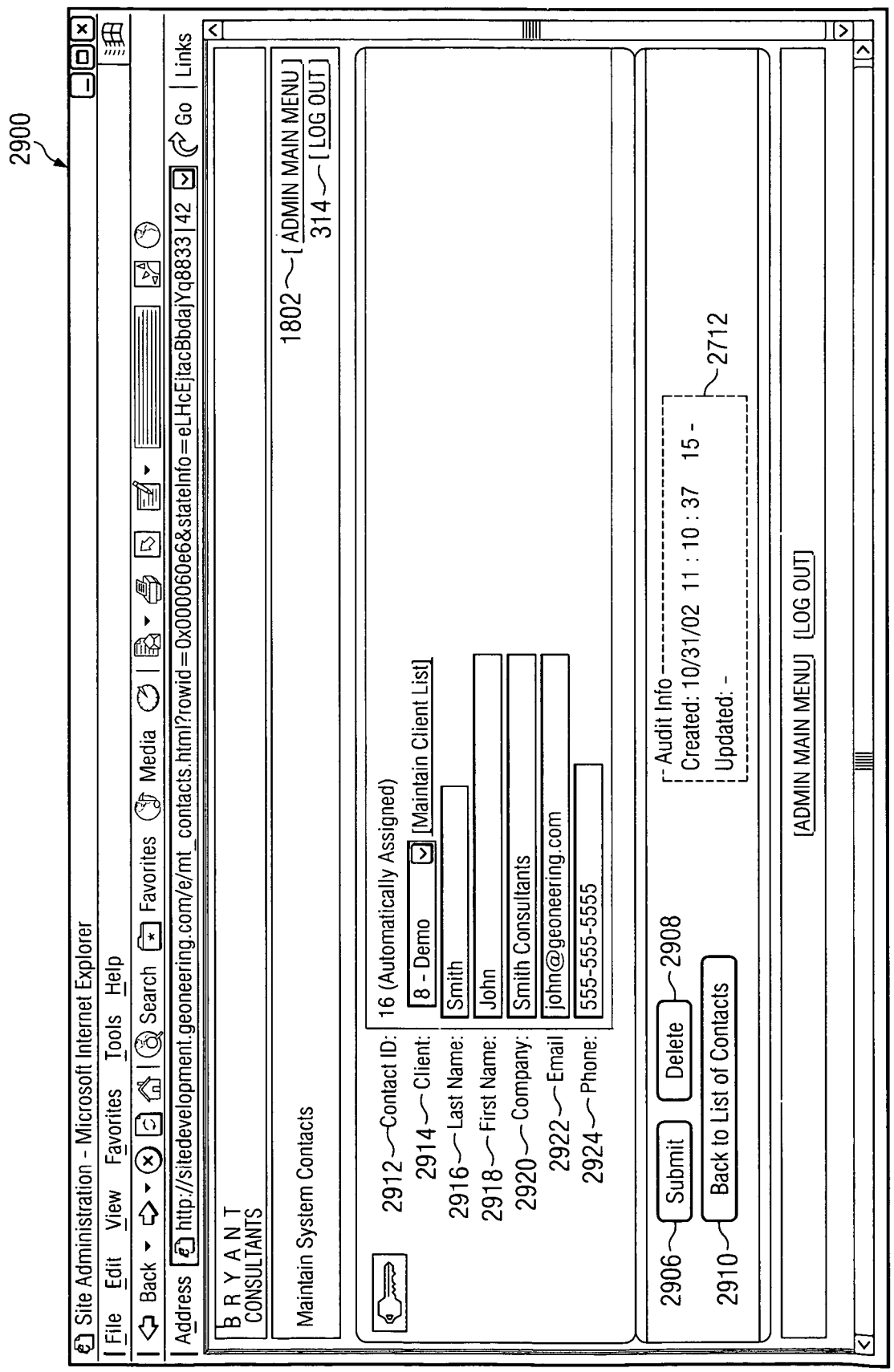
FIG. 24 is a screen shot of the specific contact screen according to the present invention.

Upon selection of the edit contact icon 2812, the database manager 3700 searches the contact database 3712 for the contact corresponding to the selected edit contact icon 2812. The information in the contact database 3712 relating to the corresponding contact is displayed on edit a contact screen 2900, FIG. 24.

Edit a contact screen 2900 contains admin main menu tab 1802 and log out tab 314. Edit a contact screen 2900 also contains contact ID box 2912 which displays the contacts ID, client drop down box 2914 which displays what client the contact is assigned to, contact last name box 2916 which displays the last name of the contact, contact first name box 2918 which displays the first name of the contact, company box 2920 which displays what company the contact works for, e-mail box 2922 which displays the contact's e-mail address, and contact phone number box 2924 which displays the contact's phone number.

The contact ID number is automatically assigned by the system 3601 based on the first blank record position in the contact database 3712. As shown by locked icon 2922, contact ID box can only be changed by a super administrator.

Edit a contact screen 2900 also contains submit contact icon 2906 which saves the displayed contact's information to the contact database 3712, contact delete icon 2908 which deletes the displayed contact from the contact database 3712, and back to the list of contacts icon 2910 which access contact screen 2800.

Edit a contact screen 2900 also contains audit information box 2712. Audit information box 2712 displays the earliest and latest date the displayed contact was modified. To obtain the earliest and latest date, the database manager 3700 queries the event database 3722 for all events related to a displayed contact. Then, using the WebSpeed® software, the system 3601 sorts the dates of the events relating to the displayed contact and displays the earliest and latest date that the contact was modified.

The add a contact screen 3620 is similar to edit a contact screen 2900 except in the add a contact screen 3620, client drop-down box 2914, contact last name box 2916, contact first name box 2918, company box 2920, E-mail box 2922, and contact phone number box 2924 are blank. After the desired information is entered into each box and upon selection of submit contact icon 2906, the information displayed into each box is saved in the contact database 3712 resulting in a new contact being added to the contact database 3712.

Figure 25:
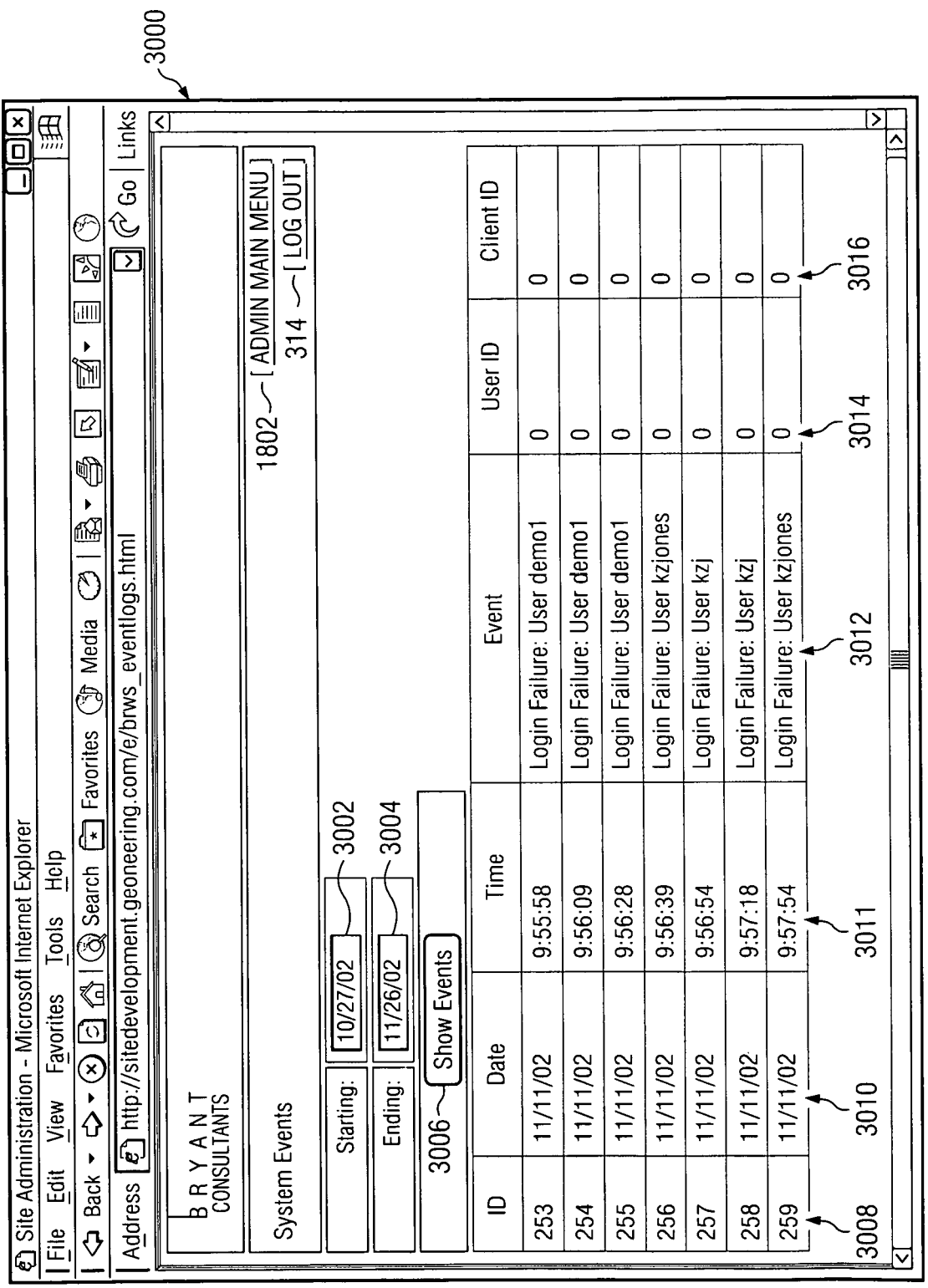
FIG. 25 is a screen shot of the system events screen according to the present invention.

System events screen 3000, FIG. 25, allows the administrator to display a listing of events from the events database 3722 based on a starting date and an ending date. System events screen 3000 contains admin main menu tab 1802, log out tab 314, and show events icon 3006. System events screen 3000 also contains start date box 3002 and end date box 3004 which displays the starting date and ending date for the listing of events. Once the administrator has entered a starting date in start date box 3002 and an ending date in end date box 3004, selection of show events button 3006 queries the events database 3722 for all events occurring on and between the start and end dates. The results of the query are listed in ID number column 3008 which displays the ID of the event, date column 3010 which displays the date the event occurred, time column 3011 which display the time the event occurred, event column 3012 which provides a brief description of the event, user ID column 3014 which displays who initiated the event, and client ID column 3016 which displays the client or provider associated with the user who initiated the event. The ID number of the event is assigned by the record number of the event in the event database 3722.

Figure 26:
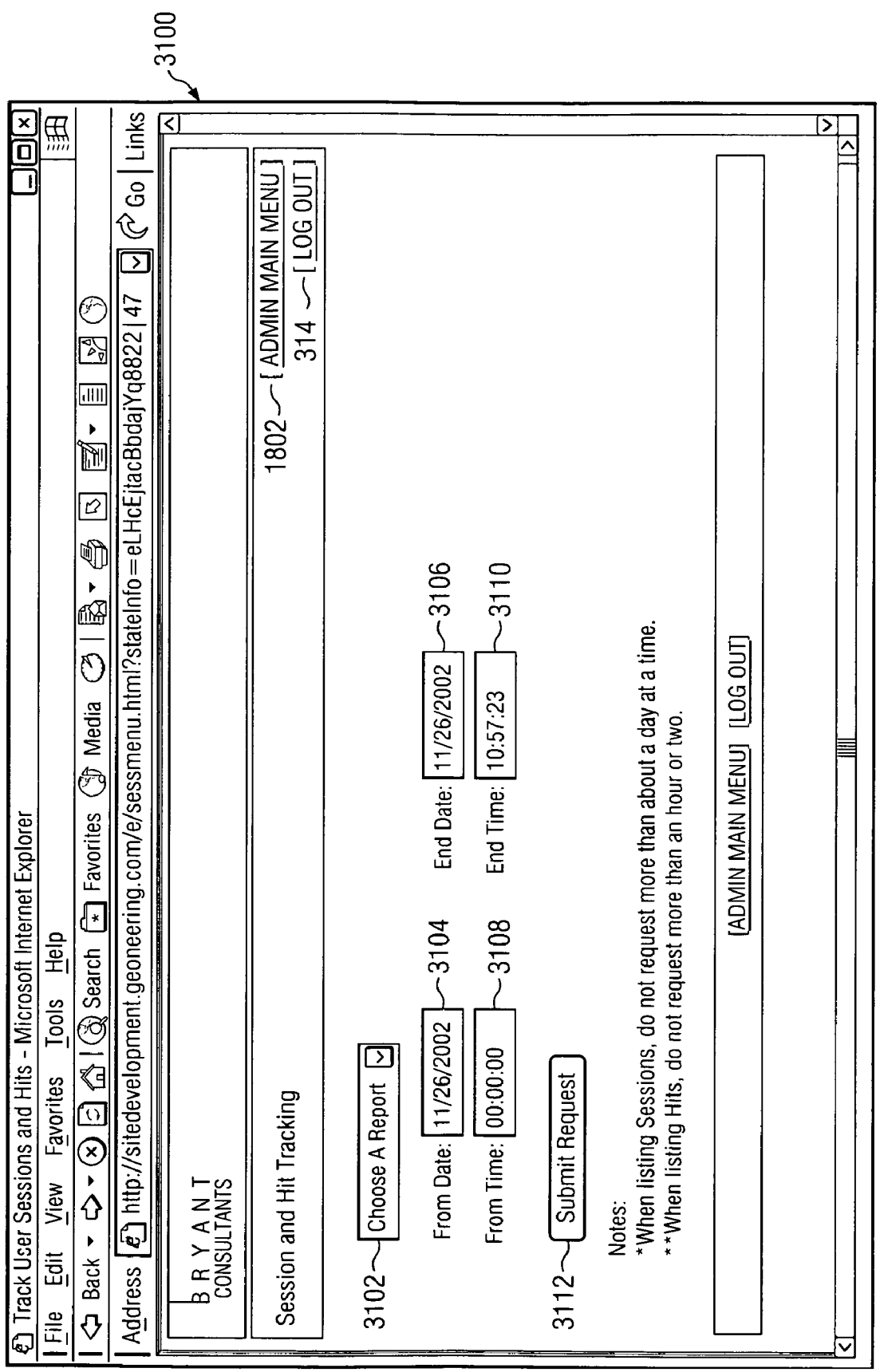
FIG. 26 is a screen shot of the session and hit tracking screen according to the present invention.

Session and hit tracking screen 3100, FIG. 26, allows the administrator to troubleshoot the system 3601 by displaying either sessions or hits that have occurred over a specific time period. Session and hit tracking screen 3100 contains admin main menu tab 1802 and log out tab 314. Session and hit tracking screen 3100 also contain report drop down menu 3102 which allows the administrator to choose between session tracking or hit tracking, start date box 3104 for selecting a start date, end date box 3106 for selecting an end date, start time box 3108 for selecting a start time, end time box 3110 for selecting an end time, and submit request icon 3112. The start date, end date, start time, and end time provide the parameters with which the database manager 3700 queries the events database 3722 for all events within the specified time period.

Figure 27:
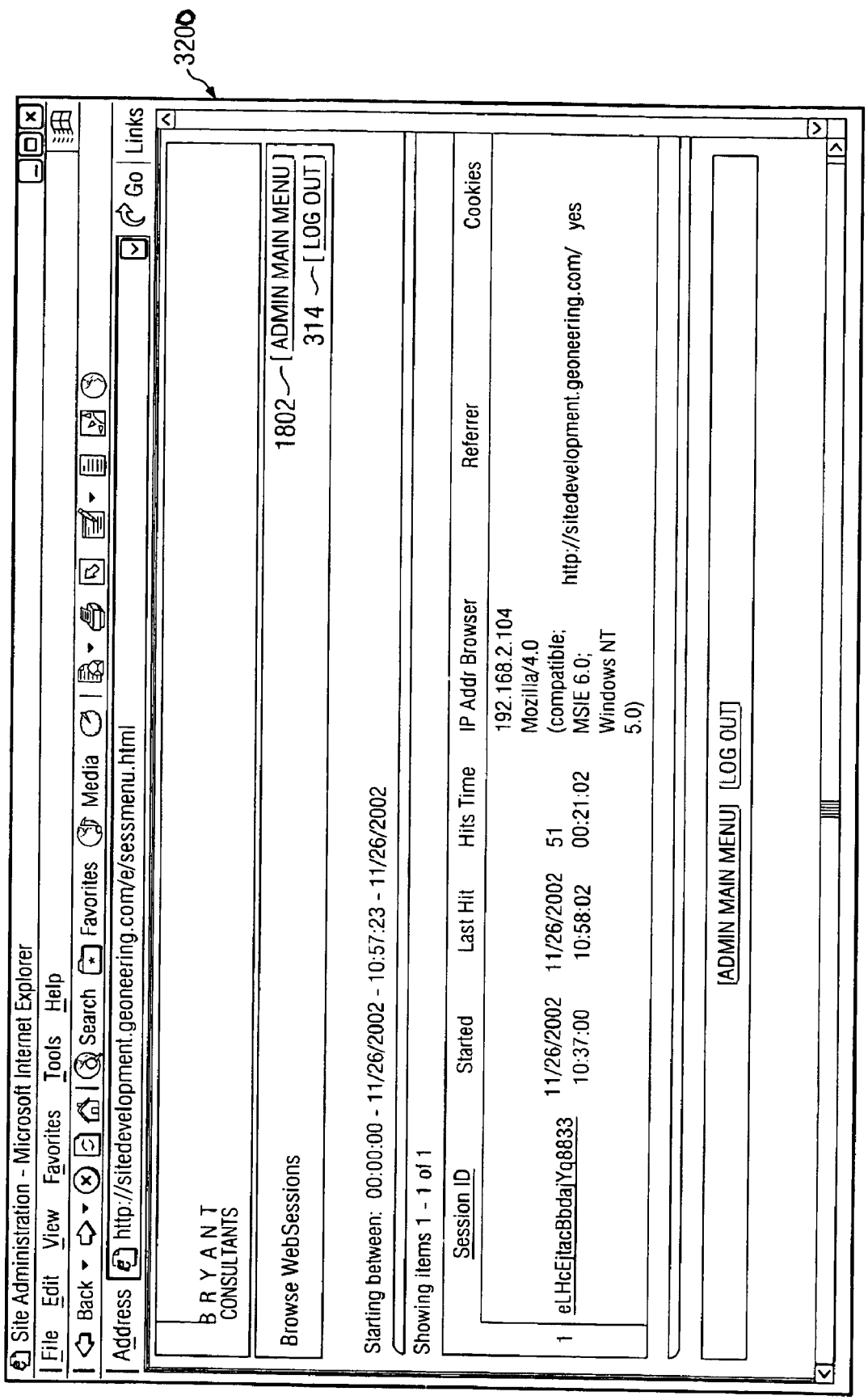
FIG. 27 is a screen shot of the session screen according to the present invention.

If a user selects session tracking from report drop down menu 3102, enters a starting date in start date box 3104 and starting time in start time box 3108 and an ending date in end date box 3106, and ending time in end time box 3110 and selects submit request icon 3112, session screen 3200, FIG. 27, is accessed.

Session screen 3200 displays all the sessions in the events database 3722 that had occurred between the dates and times entered into the start date box 3104, end date box 3106, start time box 3108 and end time box 3110. Session screen 3200 also displays admin main menu 1802 and log out tab 314.

Session screen 3200 displays the session ID, the date and time the session started, the date and time the session ended, the number of hits or requests for data to the system 3601 during the session and overall time of the session, the IP address of the browser that initiated the session, the referrer or web address of where the session originated, and whether or not cookies were enabled. A cookie is a mechanism that allows the server to store information about the user on the user's own computer. Cookies are used to record preferences and pages the user has previously accessed so the preferences and pages can be accessed more quickly in the future and do not have to be resent by the server. Use of cookies is known in the art and makes communication between the system 3601 and the user's computer more efficient. Because cookies record preferences and pages previously used, cookies can be used for troubleshooting.

Session screen 3200 is used for trouble shooting the system 3601 and gives a broad overview of access to the system 3601. For a more detailed view of use of the system 3601 hit tracking is required.

If from the session and hit tracking screen 3100 an administrator selects hit tracking from report drop down menu 3102, enters a starting date in the start date box 3104 and starting time in the start time box 3108, an ending date in the end date box 3106, and ending time in the end time box 3110 and selects the submit request icon 3112, hit tracking screen 3300, FIG. 28, is accessed.

Hit tracking screen 3300 displays all the hits in the events database 3722 that occurred between the dates and times entered into the start date box 3104, the end date box 3106, the start time box 310 and the end time box 3110. For purposes of this invention, an event is the same as a hit.

Hit tracking screen 3300 contains a hit number which indicates in what order the hit occurred during the selected time periods, the date and time the hit occurred, the object run or screen that was accessed during the hit, the query produced by the hit, and any specific cookies generated or used by the hit. Hit tracking screen 3300 is used for trouble shooting the system 3601 and gives a detailed view of the system 3601 during the specified time period.

Although the invention has been described with reference to one or more preferred embodiments, this description is not to be construed in a limiting sense. There is modification of the disclosed embodiments, as well as alternative embodiments of this invention, which will be apparent to persons of ordinary skill in the art, and the invention shall be viewed as limited only by reference to the following claims.

The invention claimed is:

1. A software system resident on a computer network for generating a risks assessment for a construction project comprising:
   a project database having a project;
   a question database having a plurality of questions including a first URL field set for locating a first set of information related to the question;
   a risk database having a plurality of risks including a second URL field set for locating a second set of information related to the risk;
   a contact database having a plurality of contacts;
   a first data entry form allowing for the selection of a project from the project database;
   a second data entry form allowing a question from the question database to be answered wherein the question relates to the selected project;
   a database organization program located on the computer network programmed to:
   locate a risk from the risk database related to the answer;
   locate a contact from the contact database related to the risk, and display graphical icon associated with the risk through the use of a plurality of discipline codes correlated to the disciplines of civil, site development, environmental, geotechnical and structural; and
   numerically sort and to tally the plurality of risks according to a completion status state and automatically generate a notification to a set of contacts from the plurality of contacts based on the completion status state.

2. The system of claim 1 further comprising a set of information sources related to the plurality of discipline codes;
   wherein the database organization program is further programmed to associate the set of information sources to the plurality of questions and the plurality of risks by using the plurality of discipline codes.

* * * * *